(12) United States Patent
Wan et al.

(10) Patent No.: US 11,368,050 B2
(45) Date of Patent: *Jun. 21, 2022

(54) WIRELESS CHARGING DEVICE, METHOD, AND DEVICE TO-BE-CHARGED

(71) Applicant: Guangdong Oppo Mobile Telecommunications Corp., Ltd., Guangdong (CN)

(72) Inventors: Shiming Wan, Guangdong (CN); Jialiang Zhang, Guangdong (CN); Shangbo Lin, Guangdong (CN); Jiada Li, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 69 days.

This patent is subject to a terminal disclaimer.

(21) Appl. No.: 16/546,244

(22) Filed: Aug. 20, 2019

(65) Prior Publication Data
US 2019/0372387 A1 Dec. 5, 2019

Related U.S. Application Data

(63) Continuation of application No. PCT/CN2018/081972, filed on Apr. 4, 2018.

(30) Foreign Application Priority Data

Apr. 7, 2017 (WO) .............. PCT/CN2017/079784
Apr. 13, 2017 (WO) .............. PCT/CN2017/080334

(51) Int. Cl.
*H02J 7/00* (2006.01)
*H02J 50/10* (2016.01)
(Continued)

(52) U.S. Cl.
CPC .............. *H02J 50/10* (2016.02); *H02J 7/00* (2013.01); *H02J 7/0068* (2013.01);
(Continued)

(58) Field of Classification Search
CPC .. H02J 50/80; H02J 50/12; H02J 50/10; H02J 7/00034; H02J 7/025; H02J 7/00;
(Continued)

(56) References Cited

U.S. PATENT DOCUMENTS 5,638,540 A  6/1997 Aldous
5,808,447 A  9/1998 Hagino
(Continued)

FOREIGN PATENT DOCUMENTS

CN  2464002 Y  12/2001
CN  1551444 A  12/2004
(Continued)

OTHER PUBLICATIONS

OA and English translation of issued in corresponding JP application No. 2019-514267 dated Aug. 7, 2020.
(Continued)

*Primary Examiner* — Binh C Tat
(74) *Attorney, Agent, or Firm* — Young Basile Hanlon & MacFarlane, P.C.

(57) ABSTRACT

A wireless charging device and a device to-be-charged are provided. The wireless charging system includes a wireless charging device and a device to-be-charged. The wireless charging device is configured to charge the device to-be-charged wirelessly. The wireless charging device includes a wireless transmitting circuit and a first communication control circuit; the device to-be-charged comprises a battery, a wireless receiving circuit, a detecting circuit, and a second communication control circuit. The second communication control circuit is configured to conduct wireless communi-
(Continued)

cation with the first communication control circuit, to send to the first communication control circuit at least one of an output voltage and an output current of the wireless receiving circuit detected by the detecting circuit, whereby the first communication control circuit adjusts a transmission power of the wireless transmitting circuit, to meet charging requirements of the battery.

9 Claims, 11 Drawing Sheets

(51) Int. Cl.

| | | |
|---|---|---|
| H02J 50/80 | (2016.01) | |
| H02J 7/02 | (2016.01) | |
| H02J 7/04 | (2006.01) | |
| H04B 5/00 | (2006.01) | |
| H02J 50/12 | (2016.01) | |
| H04B 1/04 | (2006.01) | |
| H04B 1/16 | (2006.01) | |
| H02J 50/70 | (2016.01) | |
| H04W 4/80 | (2018.01) | |
| H04B 10/11 | (2013.01) | |
| H04W 84/12 | (2009.01) | |

(52) U.S. Cl.
CPC .......... *H02J 7/00714* (2020.01); *H02J 7/025* (2013.01); *H02J 7/045* (2013.01); *H02J 50/12* (2016.02); *H02J 50/80* (2016.02); *H04B 1/04* (2013.01); *H04B 1/16* (2013.01); *H04B 5/0037* (2013.01); *H02J 7/0044* (2013.01); *H02J 50/70* (2016.02); *H04B 10/11* (2013.01); *H04W 4/80* (2018.02); *H04W 84/12* (2013.01)

(58) Field of Classification Search
CPC ...... H02J 7/0044; H02J 7/00714; H02J 7/045; H02J 7/007182; H02J 50/005; H02J 7/1446; H02J 50/70; H02J 7/0068; H02J 7/00045; H02J 2207/20; H02J 2207/30; H02J 5/005; H02J 50/40; H02J 7/00041; H02J 7/0026; H02J 7/0029; H02J 7/00309; H02J 7/0047; H02J 7/007194; H02J 7/02; H02J 50/27; H02J 7/342; H02J 7/345; H02J 50/20; H02J 50/30; H02J 50/90; H02J 7/00032; H02J 7/00047; H02J 7/0014; H02J 7/0016; H02J 7/0042; H02J 7/0048; H02J 7/04; H04B 5/0037; H04B 1/3888; H04B 1/04; H04B 1/16; H02M 3/24; H02M 7/48
USPC .................................................. 320/106–115
See application file for complete search history.

(56) References Cited

U.S. PATENT DOCUMENTS

| | | |
|---|---|---|
| 6,208,115 B1 | 3/2001 | Binder |
| D712,888 S | 9/2014 | Fujimura et al. |
| D756,948 S | 5/2016 | Kim et al. |
| D756,949 S | 5/2016 | Kim et al. |
| D790,535 S | 6/2017 | Akana et al. |
| D802,571 S | 11/2017 | Fan |
| D806,705 S | 1/2018 | Akana et al. |
| D813,214 S | 3/2018 | Fan |
| D814,455 S | 4/2018 | Kwon |
| D820,255 S | 6/2018 | Akana et al. |
| D834,553 S | 11/2018 | Depape et al. |
| D839,232 S | 1/2019 | Itou |
| 10,778,040 B2 | 9/2020 | Wan et al. |
| 2004/0080891 A1 | 4/2004 | Shyr |
| 2007/0139012 A1 | 6/2007 | Hayashigawa |
| 2008/0054855 A1 | 3/2008 | Hussain et al. |
| 2011/0156655 A1 | 6/2011 | Kim |
| 2012/0104997 A1 | 5/2012 | Carobolante |
| 2012/0300413 A1 | 11/2012 | Iida |
| 2013/0002026 A1 | 1/2013 | Mizutani et al. |
| 2013/0002202 A1 | 1/2013 | Kuraishi |
| 2013/0033235 A1 | 2/2013 | Fukaya |
| 2013/0099591 A1 | 4/2013 | Yeo et al. |
| 2013/0140906 A1 | 6/2013 | Tanabe |
| 2013/0141034 A1 | 6/2013 | Huang et al. |
| 2013/0285604 A1 | 10/2013 | Partovi |
| 2014/0191568 A1 | 7/2014 | Partovi |
| 2014/0247052 A1 | 9/2014 | Hada |
| 2014/0329472 A1 | 11/2014 | Kovacs et al. |
| 2014/0347008 A1* | 11/2014 | Chae ................ H02J 50/12 320/108 |
| 2014/0379047 A1 | 12/2014 | Meskens |
| 2015/0015180 A1 | 1/2015 | Miller |
| 2015/0054456 A1 | 2/2015 | Yamakawa et al. |
| 2015/0180249 A1* | 6/2015 | Jeon ................ H02J 7/0047 320/108 |
| 2015/0214748 A1 | 7/2015 | Lin et al. |
| 2015/0236538 A1 | 8/2015 | Cai et al. |
| 2015/0357851 A1 | 12/2015 | Huang et al. |
| 2015/0372497 A1* | 12/2015 | Bae ................ H02J 50/12 307/104 |
| 2016/0006267 A1 | 1/2016 | Muratov et al. |
| 2016/0020630 A1 | 1/2016 | Tseng et al. |
| 2016/0036497 A1 | 2/2016 | Tavakoli Shiraji et al. |
| 2016/0049825 A1 | 2/2016 | Green et al. |
| 2016/0099601 A1 | 4/2016 | Leabman et al. |
| 2016/0099610 A1* | 4/2016 | Leabman ............... H02J 50/001 307/104 |
| 2016/0204642 A1 | 7/2016 | Oh et al. |
| 2016/0320867 A1 | 11/2016 | Chan et al. |
| 2016/0355095 A1 | 12/2016 | Okamoto |
| 2016/0380467 A1 | 12/2016 | Shao |
| 2017/0033590 A1 | 2/2017 | Lee et al. |
| 2017/0040810 A1 | 2/2017 | Hu et al. |
| 2017/0187215 A1 | 6/2017 | Noda et al. |
| 2017/0203656 A1* | 7/2017 | Okamoto ............ H02J 7/00034 |
| 2017/0324279 A1* | 11/2017 | Kang ................ H02J 50/12 |
| 2018/0034305 A1 | 2/2018 | Lee et al. |
| 2018/0115179 A1 | 4/2018 | Fan et al. |
| 2019/0356154 A1* | 11/2019 | Wan ................ H02J 7/0026 |
| 2019/0379245 A1 | 12/2019 | Wan |

FOREIGN PATENT DOCUMENTS

| | | |
|---|---|---|
| CN | 101233666 A | 7/2008 |
| CN | 101330229 A | 12/2008 |
| CN | 102013717 A | 4/2011 |
| CN | 102522799 A | 6/2012 |
| CN | 103001297 A | 3/2013 |
| CN | 103036282 A | 4/2013 |
| CN | 103078381 A | 5/2013 |
| CN | 202998182 U | 6/2013 |
| CN | 103269108 A | 8/2013 |
| CN | 103944243 A | 7/2014 |
| CN | 104037918 A | 9/2014 |
| CN | 104160589 A | 11/2014 |
| CN | 104283293 A | 1/2015 |
| CN | 104467130 A | 3/2015 |
| CN | 104578209 A | 4/2015 |
| CN | 104600869 A | 5/2015 |
| CN | 104617632 A | 5/2015 |
| CN | 104701955 A | 6/2015 |
| CN | 104752046 A | 7/2015 |
| CN | 105098900 A | 11/2015 |
| CN | 105148402 A | 12/2015 |
| CN | 105226779 A | 1/2016 |
| CN | 105337384 A | 2/2016 |
| CN | 105471001 A | 4/2016 |
| CN | 105515210 A | 4/2016 |
| CN | 105529802 A | 4/2016 |
| CN | 104283293 B | 6/2016 |
| CN | 205355893 U | 6/2016 |

(56) References Cited

FOREIGN PATENT DOCUMENTS

| | | |
|---|---|---|
| CN | 105826066 A | 8/2016 |
| CN | 105896670 A | 8/2016 |
| CN | 105978049 A | 9/2016 |
| CN | 106026237 A | 10/2016 |
| CN | 106026257 A | 10/2016 |
| CN | 106026327 A | 10/2016 |
| CN | 106104958 A | 11/2016 |
| CN | 106169798 A | 11/2016 |
| CN | 106169799 A | 11/2016 |
| CN | 106300539 A | 1/2017 |
| CN | 106451705 A | 2/2017 |
| CN | 106505751 A | 3/2017 |
| EP | 1763125 A2 | 3/2007 |
| EP | 1821383 A2 | 8/2007 |
| EP | 2590300 A1 | 5/2013 |
| EP | 2824797 A1 | 1/2015 |
| EP | 3068017 A2 | 9/2016 |
| EP | 3113329 A1 | 1/2017 |
| EP | 3131172 A1 | 2/2017 |
| EP | 3133746 A1 | 2/2017 |
| EP | 3609040 A1 | 2/2020 |
| JP | H03189569 A | 8/1991 |
| JP | H07177653 A | 7/1995 |
| JP | H09121462 A | 5/1997 |
| JP | 10258129 A | 9/1998 |
| JP | 2000333377 A | 11/2000 |
| JP | 2007288889 A | 11/2007 |
| JP | 2008099370 A | 4/2008 |
| JP | 2009504116 A | 1/2009 |
| JP | 2009504117 A | 1/2009 |
| JP | 2009518144 A | 5/2009 |
| JP | 2009273327 A | 11/2009 |
| JP | 2011034306 A | 2/2011 |
| JP | 2011509101 A | 3/2011 |
| JP | 2011120361 A | 6/2011 |
| JP | 2011139622 A | 7/2011 |
| JP | 2011152018 A | 8/2011 |
| JP | 2011234486 A | 11/2011 |
| JP | 2012205499 A | 10/2012 |
| JP | 2012249410 A | 12/2012 |
| JP | 2013038854 A | 2/2013 |
| JP | 2013115859 A | 6/2013 |
| JP | 2013128400 A | 6/2013 |
| JP | 2013172560 A | 9/2013 |
| JP | 2013183496 A | 9/2013 |
| JP | 2013183523 A | 9/2013 |
| JP | 2013230007 A | 11/2013 |
| JP | 2013243890 A | 12/2013 |
| JP | 2014023348 A | 2/2014 |
| JP | 2014117124 A | 6/2014 |
| JP | 2014155281 A | 8/2014 |
| JP | 2015006068 A | 1/2015 |
| JP | 2015070689 A | 4/2015 |
| JP | 2015156776 A | 8/2015 |
| JP | 2016015862 A | 1/2016 |
| JP | 2016063725 A | 4/2016 |
| JP | 2016063726 A | 4/2016 |
| JP | 2016086472 A | 5/2016 |
| JP | 2016092959 A | 5/2016 |
| JP | 2016092986 A | 5/2016 |
| JP | 2016123162 A | 7/2016 |
| JP | 2016152722 A | 8/2016 |
| JP | 2016525331 A | 8/2016 |
| JP | 2017022804 A | 1/2017 |
| JP | 2017046521 A | 3/2017 |
| JP | 2017060328 A | 3/2017 |
| KR | 100792311 B1 | 1/2008 |
| KR | 20120092038 A | 8/2012 |
| KR | 20130007985 A | 1/2013 |
| KR | 20130023618 A | 3/2013 |
| KR | 101270675 B1 | 6/2013 |
| KR | 20130124698 A | 11/2013 |
| KR | 101580342 B1 | 12/2015 |
| KR | 20160027828 A | 3/2016 |
| KR | 20160028537 A | 3/2016 |
| KR | 20160110023 A | 9/2016 |
| KR | 101676591 B1 | 11/2016 |
| KR | 20170007814 A | 1/2017 |
| KR | 20170033902 A | 3/2017 |
| RU | 149860 U1 | 1/2015 |
| RU | 2596604 C2 | 9/2016 |
| TW | 201145753 A | 12/2011 |
| TW | I482391 B | 4/2015 |
| TW | 201533561 A | 9/2015 |
| TW | I552483 B | 10/2016 |
| WO | 2014176839 A1 | 1/2014 |
| WO | 2014115193 A1 | 7/2014 |
| WO | 2015125655 A1 | 8/2015 |
| WO | 2016043099 A1 | 3/2016 |
| WO | 2016074458 A1 | 5/2016 |
| WO | 2018184578 A1 | 10/2018 |

OTHER PUBLICATIONS

Examination report No. 2 issued in corresponding AU application No. 2018249245 dated Sep. 7, 2020.
OA and English Translation issued in corresponding JP application No. 2019-553917 dated Sep. 29, 2020.
OA and English Translation issued in corresponding KR application No. 10-2019-7030202 dated Sep. 23, 2020.
OA issued in corresponding CA application No. 3053269 dated Oct. 23, 2020.
English translation of the first office action issued in corresponding CN application No. CN201780041786.3 dated May 6, 2020.
English translation of the second office action issued in corresponding CN application No. CN201780041786.3 dated Jul. 10, 2020.
Extended European search report issued in corresponding European application No. 17905763.3 dated Jul. 15, 2019.
Communication pursuant to Article 94(3) EPC issued in corresponding European application No. 17905763.3 dated Jan. 15, 2020.
Communication pursuant to Article 94(3) EPC issued in corresponding European application No. 17905763.3 dated Jun. 4, 2020.
First Examination Report issued in corresponding IN application No. 201917000972 dated Mar. 2, 2020.
English translation of the TW office action issued in corresponding TW application No. 107112719 dated Jan. 10, 2019.
Communication pursuant to Article 94(3) EPC issued in corresponding European application No. 17904556.2 dated Dec. 4, 2019.
Communication pursuant to Article 94(3) EPC issued in corresponding European application No. 17904556.2 dated May 4, 2020.
The extended European search report issued in corresponding European application No. 17904431.8 dated Sep. 26, 2019.
Communication pursuant to Article 94(3) EPC issued in corresponding European application No. 17904431.8 dated Jun. 16, 2020.
First Examination Report issued in corresponding IN application No. 201917008151 dated Jun. 12, 2020.
English translation of the Notice of Reasons for Refusal issued in corresponding JP application No. 2019-514267 dated May 29, 2020.
English translation of the Notification of Reason for Refusal issued in corresponding KR application No. 2019-7007549 dated Mar. 26, 2020.
English translation of the Notification Letter of Review Opinions issued in corresponding TW application No. 107112166 dated Jan. 4, 2019.
International search report issued in corresponding international application No. PCT/CN2017/085990 dated Jan. 15, 2018.
Examination report No. 1 issued in corresponding AU application No. 2018249245 dated Jul. 6, 2020.
First Examination Report issued in corresponding IN application No. 201917033500 dated Jul. 10, 2020.
English translation of the Office action issued in corresponding RU application No. 2019127748 dated Jul. 29, 2020.
Extended European search report issued in corresponding European application No. 17904556.2 dated Apr. 5, 2019.
International search report issued in corresponding international application No. PCT/CN2018/081963 dated Jul. 11, 2018.
International search report issued in corresponding international application No. PCT/CN2018/081962 dated Jun. 29, 2018.

(56) References Cited

OTHER PUBLICATIONS

Extended European search report issued in corresponding European application No. 18781210.2 dated Mar. 16, 2020.
Search report issued in corresponding SG application No. 11201907726V dated May 13, 2020.
International search report issued in corresponding international application No. PCT/CN2017/080334 dated Jan. 18, 2018.
International search report issued in corresponding international application No. PCT/CN2018/081972 dated Jun. 15, 2018.
International search report issued in corresponding international application No. PCT/CN2017/079784 dated Dec. 4, 2017.
Examination report issued in corresponding European application No. 17904431.8 dated Dec. 15, 2020.
Examination report issued in corresponding European application No. 18781210.2 dated Dec. 9, 2020.
Decision of Rejection with English Translation issued in corresponding JP application No. 2019-553917 dated Feb. 5, 2021.
2nd Written Opinion issued in corresponding SG application No. 11201907726V dated Nov. 24, 2020.
Decision for rejection with English Translation issued in corresponding CN application No. 201780041786.3 dated Jan. 26, 2021.
Charging protocols for lithium-ion batteries and their impact on cycle life, XP 55765066.
Examination report issued in corresponding European application No. 17904556.2 dated Jan. 19, 2021.
OA issued with English Translation in corresponding KR application No. 10-2019-7027259 dated Jan. 27, 2021.
NOA with English Translation issued in corresponding KR application No. 10-2019-7026966 dated Feb. 2, 2021.
Non-Final OA issued in corresponding U.S. Appl. No. 16/238,162 dated Feb. 1, 2021.
Non-Final OA issued in corresponding U.S. Appl. No. 16/271,131 dated Jan. 25, 2021.
Decision to refuse with English Translation issued in corresponding JP application No. 2019545913 dated Apr. 27, 2021.
Final rejection with English Translation issued in corresponding KR application No. 20197007549 dated Mar. 19, 2021.
Notice of reasons for refusal with English Translation issued in corresponding JP application No. 2019539764 dated Apr. 2, 2021.
Communication pursuant to Article 94(3) EPC for EP Application 17904431.8 dated Nov. 10, 2021. (5 pages).
Chinese Office Action with English Translation for CN Application 201910192398.6 dated Jan. 19, 2022. (35 pages).
Canadian Office Action for CA Application 3053269 dated Jun. 25, 2021. (6 pages).
Communication pursuant to Article 94(3) EPC for EP Application 17904431.8 dated Jun. 10, 2021. (4 pages).
Communication pursuant to Article 94(3) EPC for EP Application 18781210.2 dated Jun. 10, 2021. (5 pages).
Japanese Decision to Grant a Patent with English Translation for JP Application 2019-553917 dated Jun. 29, 2021. (5 pages).
Final Rejection for U.S. Appl. No. 16/271,131 dated Jul. 2, 2021. (41 pages).
Chinese First Office Action with English Translation for CN Application 201780017139.9 dated Aug. 23, 2021. (52 pages).
Chinese First Office Action with English Translation for CN Application 201780041668.2 dated Jul. 27, 2021. (56 pages).
Communication pursuant to Article 94(3) EPC for EP Application 17904556.2 dated Jul. 15, 2021. (4 pages).

Li J. et al., The effects of pulse charging on cycling characteristics of commercial lithium-ion batteries, Journal of Power Sources, Elseveir SA, CH, vol. 102, No. 1-2, Dec. 1, 2001 (Dec. 1, 2001), pp. 302-309.
Chinese Notice of Review Office Action with English ransiation for CN Application 20180041786.3 dated Sep. 28, 2021. (18 pages).
Communication pursuant to Article 94(3) EPC for EP Application 17904556.2 dated Sep. 14, 2021. (5 pages).
Indian examination Report for IN Application 20191009580 dated Jul. 21, 2020. (6 pages).
Japanese Notice of Reasons for Refusal with English Translation for JP Application 2019545913 dated Sep. 29, 2020. (12 pages).
Japanese Notice of Reasons for Refusal with English Translation for JP Application 2019539764 dated Sep. 1, 2020. (16 pages).
Korean Office Action with English Translation for KR Application 1020197007549 dated Aug. 7, 2020. (8 pages).
Korean Notification of Reason for Refusal with English Translation for KR Application 1020197007549 dated Sep. 4, 2020. (24 pages).
Korean Grant of Patent with English Translation for KR Application 1020197007549 dated Oct. 12, 2021. (7 pages).
Korean Office Action with English Translation for KR Application 1020197026966 dated Aug. 18, 2020. (8 pages).
Non-final Rejection for U.S. Appl. No. 16/271,131 dated Oct. 14, 2021. (17 pages).
Hearing Notice issued in corresponding IN application No. 201917000972 dated Feb. 21, 2022.
Chinese Decision for reexamination with English Translation for CN Application 201780041786.3 dated Feb. 28, 2022. (28 pages).
Chinese Second Office Action with English Translation for CN Application 201780017139.9 dated Feb. 7, 2022, (46 pages).
Korean Office Action with English Translation for KR Application 20197027786 dated Oct. 22, 2021, (12 pages).
Communication pursuant to Article 94(3) EPC for EP Application 17904556.2 dated Jan. 13, 2022. (5 pages).
Non-Final Office Action for U.S. Appl. No. 16/551,573 dated Dec. 9, 2020. (28 pages).
International Search Report with English Translation for PCT Application PCT/CN2018/076713 dated May 18, 2018. (3 pages).
Extended European Search Report for EP Application 18781580.8 dated Jan. 24, 2020. (8 pages).
Communication pursuant to Article 94(3) EPC for EP Application 18781580.8 dated Jun. 25, 2020. (5 pages).
Notice of Reasons for Refusal with English Translation for JP Application 2019549385 dated Oct. 2, 2020, (13 pages).
Communication pursuant, to Article 94(3) EPC for EP Application 18781580.8 dated Oct. 9, 2020, (5 pages).
Chinese third Office Action with English Translation for CN Application 201780041786.3 dated Oct. 29, 2020. (28 pages).
Communication pursuant to Article 94(3) EPC for EP Application 18781580.8 dated Jan. 26, 2021. (6 pages).
Japanese Notice of reasons for refusal with English Translation for JP Application 2019549385 dated Mar. 9, 2021. (12 pages).
Korean Office Action with English Translation for KR Application 20197027786 dated Feb. 22, 2021, (12 pages).
Japanese Notice of reasons for refusal with English Translation for JP Application 2019549385 dated Jun. 18, 2021. (6 pages).
Korean Notice of Final Rejection with English Translation for KR Application 1020197027786 dated Aug. 20, 2021. (8 pages).
Chinese Second Office Action with English Translation for CN Application 201780041668.2 dated Jan. 26, 2022. (25 pages).
Indian Examination Report for IN Application 201917031642 dated Oct. 7, 2021. (5 pages).

* cited by examiner

DEVICE TO-BE-CHARGED CONDUCTS WIRELESS COMMUNICATION WITH THE WIRELESS CHARGING DEVICE, TO SEND THE OUTPUT VOLTAGE AND/OR OUTPUT CURRENT DETECTED BY THE DETECTING CIRCUIT TO THE WIRELESS CHARGING DEVICE, WHEREBY THE WIRELESS CHARGING DEVICE ADJUSTS THE TRANSMISSION POWER OF THE WIRELESS TRANSMITTING CIRCUIT TO MEET CHARGING REQUIREMENTS OF THE BATTERY — 1110

FIG. 11

DURING WIRELESS CHARGING OF THE DEVICE TO BE CHARGED, WIRELESS CHARGING DEVICE CONDUCTS WIRELESS COMMUNICATION WITH DEVICE TO-BE-CHARGED TO ADJUST THE TRANSMISSION POWER OF THE WIRELESS TRANSMITTING CIRCUIT TO MEET CHARGING REQUIREMENTS OF THE BATTERY — 1110

FIG. 12

COMMUNICATE WITH WIRELESS CHARGING DEVICE TO SEND THE OUTPUT VOLTAGE AND/OR OUTPUT CURRENT DETECTED BY THE DETECTING CIRCUIT TO THE WIRELESS CHARGING DEVICE, WHEREBY THE WIRELESS CHARGING DEVICE ADJUSTS THE TRANSMISSION POWER THEREOF TO MEET CHARGING REQUIREMENTS OF THE BATTERY — 1310

FIG. 13

WIRELESS CHARGING DEVICE, METHOD, AND DEVICE TO-BE-CHARGED

CROSS-REFERENCE TO RELATED APPLICATION(S)

This application is a continuation of PCT Application No. PCT/CN2018/081972, filed on Apr. 4, 2018, which claims priority to PCT Application No. PCT/CN2017/079784, filed on Apr. 7, 2017 and PCT Application No. PCT/CN2017/080334, filed on Apr. 13, 2017, the entire disclosures of all of which are hereby incorporated by reference.

TECHNICAL FIELD

This disclosure relates to the field of wireless charging, and more particularly to a wireless charging device, a wireless charging method, and a device to-be-charged.

BACKGROUND

At present, in the charging field, a device to-be-charged is charged mainly in a wired charging manner.

Taking mobile phones as an example, currently, the mobile phone is still charged mainly in a wired charging manner. When the mobile phone needs to be charged, the mobile phone can be coupled with a power supply device via a charging cable such as a universal serial bus (USB) cable and an output power of the power supply device can be transmitted to the mobile phone via the charging cable to charge a battery of the mobile phone.

As to the device to-be-charged, the charging cable is required for wired charging, which results in complicated operations in a charging preparation stage. Therefore, a wireless charging manner is enjoying increasing popularity among users. However, a conventional wireless charging manner is poor in efficiency and thus needs to be improved.

SUMMARY

Implementations of the present disclosure provide a wireless charging device, a wireless charging method, and a device to-be-charged.

According to an aspect of the present disclosure, a wireless charging device is provided. The wireless charging device includes a wireless transmitting circuit and a communication control circuit (corresponding to the first communication control circuit in the foregoing wireless charging system). The wireless transmitting circuit is configured to transmit an electromagnetic signal. The communication control circuit is configured to conduct wireless communication with the device to-be-charged during wireless charging, to adjust the transmission power of the wireless transmitting circuit, so as to meet charging requirements of a battery of the device to-be-charged.

According to another aspect of the present disclosure, a device to-be-charged is provided. The device to-be-charged includes a battery, a wireless receiving circuit, a detecting circuit, and a communication control circuit (corresponding to the second communication control circuit in the foregoing wireless charging system). The wireless receiving circuit is configured to receive an electromagnetic signal from a wireless charging device and convert the electromagnetic signal to provide an output voltage and an output current to the battery. The detecting circuit is configured to detect the output voltage and/or output current of the wireless receiving circuit. The communication control circuit is configured to conduct wireless communication with the wireless charging device, to send the output voltage and/or output current detected by the detecting circuit to the wireless charging device, whereby the wireless charging device adjusts a transmission power thereof to meet charging requirements of the battery.

According to another aspect of the present disclosure, a wireless charging method is provided. The method is applicable to a device to-be-charged. The device to-be-charged includes a battery, a receiving circuit, and a detecting circuit. The wireless receiving circuit is configured to receive an electromagnetic signal transmitted by a wireless charging device, and convert the electromagnetic signal to provide an output voltage and an output current to the battery. The detecting circuit is configured to detect the output voltage and/or output current of the wireless receiving circuit. The method includes the following. Communicate with the wireless charging device to send the output voltage and/or output current detected by the detecting circuit to the wireless charging device, whereby the wireless charging device adjust a transmission power thereof, so as to meet charging requirements of the battery.

BRIEF DESCRIPTION OF THE DRAWINGS

FIG. 11 is a schematic flowchart of a wireless charging method according to an implementation of the present disclosure.

FIG. 12 is a schematic flowchart of a wireless charging method according to another implementation of the present disclosure.

FIG. 13 is a schematic flowchart of a wireless charging method according to another implementation of the present disclosure.

DETAILED DESCRIPTION

According to implementations of the present disclosure, a device to-be-charged is charged based on wireless charging technology. The wireless charging technology does not require a cable for power delivery, which can simplify operations in a charging preparation stage.

Conventional wireless charging technology generally couples a power supply device (such as an adaptor) with a wireless charging device (such as a wireless charging base), and an output power of the power supply device is transmitted to a device to-be-charged via the wireless charging device in a wireless manner (such as via an electromagnetic signal or an electromagnetic wave) for wireless charging of the device to-be-charged.

According to various wireless charging principles, the wireless charging manner mainly includes three types: magnetic coupling (or electromagnetic induction), magnetic resonance, and radio waves. At present, mainstream wireless charging standard includes QI standard, power matters alliance (PMA) standard, and alliance for wireless power (A4WP) standard. Under the QI standard and in the PMA standard, a magnetic coupling manner is adopted for wireless charging and under the A4WP standard, a magnetic resonance manner is adopted for wireless charging.

Figure 1:
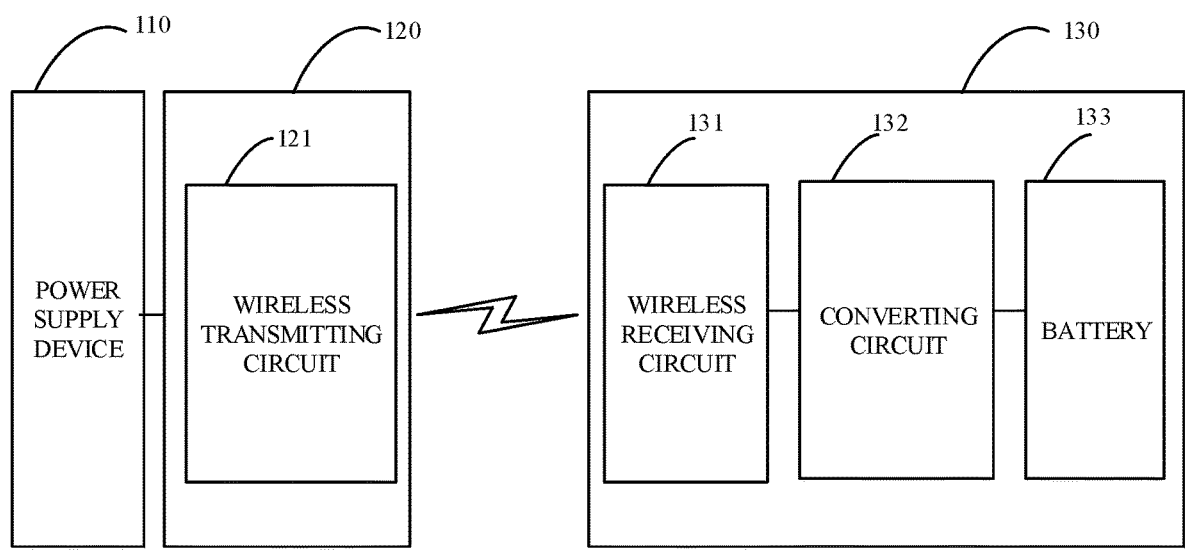
FIG. 1 is an exemplary structural diagram of a conventional wireless charging system.

The following will describe a conventional wireless charging manner in conjunction with FIG. 1.

As illustrated in FIG. 1, a wireless charging system includes a power supply device 110, a wireless charging device 120, and a device to-be-charged 130. The wireless charging device 120 can be, for example, a wireless charging base. The device to-be-charged 130 can be, for example, a terminal.

After the power supply device 110 is coupled with the wireless charging device 120, an output current of the power supply device 110 can be transmitted to the wireless charging device 120. The wireless charging device 120 can convert the output current of the power supply device 110 into an electromagnetic signal (or an electromagnetic wave) via an internal wireless transmitting circuit 121 for transmission. For example, the wireless transmitting circuit 121 can convert the output current of the power supply device 110 into an alternating current (AC) and convert the AC into the electromagnetic signal via a transmitting coil or a transmitting antenna (not illustrated in FIG. 1).

The device to-be-charged 130 can receive the electromagnetic signal from the wireless transmitting circuit 121 via a wireless receiving circuit 131 and convert the electromagnetic signal into an output current of the wireless receiving circuit 131. For example, the wireless receiving circuit 131 can convert the electromagnetic signal transmitted by the wireless transmitting circuit 121 into an AC via a receiving coil or a receiving antenna (not illustrated in FIG. 1) and rectify and/or filter the AC to convert the AC into an output voltage and the output current of the wireless receiving circuit 131.

As to the conventional wireless charging technology, before wireless charging begins, the wireless charging device 120 and the device to-be-charged 130 will negotiate a transmission power of the wireless transmitting circuit 121. When such power negotiated between the wireless charging device 120 and the device to-be-charged 130 is 5 W (watt) for example, the output voltage and the output current of the wireless receiving circuit 131 are respectively 5V (volt) and 1 A (ampere) in general. When the power negotiated between the wireless charging device 120 and the device to-be-charged 130 is 10.8 W for example, the output voltage and the output current of the wireless receiving circuit 131 are respectively 9V and 1.2 A in general.

The output voltage of the wireless receiving circuit 131 is however not suitable to be applied directly to a battery 133. Instead, the output voltage needs to be converted by a converting circuit 132 of the device to-be-charged 130 to obtain expected charging voltage and/or charging current of the battery 133 of the device to-be-charged 130.

The converting circuit 132 can be configured to convert the output voltage of the wireless receiving circuit 131 to meet requirements on the expected charging voltage and/or charging current of the battery 133.

As an example, the converting circuit 132 can be a charging management module, such as a charging integrated circuit (IC). When the battery 133 is charged, the converting circuit 132 is configured to manage a charging voltage and/or a charging current of the battery 133. The converting circuit 132 can include at least one of a voltage feedback function and a current feedback function to achieve management of at least one of the charging voltage and the charging current of the battery 133 respectively.

For example, a charging process of the battery can include at least one of a trickle charging stage, a constant-current charging stage, and a constant-voltage charging stage. In the trickle charging stage, the converting circuit 132 can utilize the current feedback function to make current flowing into the battery 133 in the trickle charging stage satisfy the expected charging current of the battery 133 (such as a first charging current). In the constant-current charging stage, the converting circuit 132 can utilize the current feedback function to make current flowing into the battery 133 in the constant-current charging stage satisfy the expected charging current of the battery 133 (such as a second charging current, which may be larger than the first charging current). In the constant-voltage charging stage, the converting circuit 132 can utilize the voltage feedback function to make voltage applied to the battery 133 in the constant-voltage charging stage satisfy the expected charging voltage of the battery 133.

As one example, when the output voltage of the wireless receiving circuit 131 is higher than the expected charging voltage of the battery 133, the converting circuit 132 can be configured to decrease (that is, step down) the output voltage of the wireless receiving circuit 131 to make decreased charging voltage meet requirements on the expected charging voltage of the battery 133. As another example, when the output voltage of the wireless receiving circuit 131 is lower than the expected charging voltage of the battery 133, the converting circuit 132 can be configured to increase (that is, step up) the output voltage of the wireless receiving circuit 131 to make increased charging voltage meet requirements on the expected charging voltage of the battery 133.

As yet another example, the output voltage of the wireless receiving circuit 131 is a constant 5V voltage, for example. When the battery 133 includes a single cell (for example, a lithium battery cell has a 4.2V charging cut-off voltage), the converting circuit 132 (such as a Buck circuit) can decrease the output voltage of the wireless receiving circuit 131 to make the decreased charging voltage meet requirements on the expected charging voltage of the battery 133.

As still another example, the output voltage of the wireless receiving circuit 131 is a constant 5V voltage, for example. When the battery 133 includes two or more single-cells coupled in series (for example, lithium battery cells, and each cell has a 4.2V charging cut-off voltage), the converting circuit 132 (such as a Boost circuit) can increase the output voltage of the wireless receiving circuit 131 to make the increased charging voltage meet requirements on the expected charging voltage of the battery 133.

The converting circuit 132 is limited by low circuit conversion efficiency, which causes electrical energy that fails to be converted to dissipate in the form of heat. The heat can be accumulated inside the device to-be-charged 130. Since designed space and heat dissipation space of the device to-be-charged 130 are both very small, for example, the physical size of a user's mobile terminal is increasingly lighter and thinner, and a large number of electronic components are densely arranged in the mobile terminal at the same time, difficulty in designing the converting circuit 132 is increased. In addition, it is difficult to remove promptly heat accumulated inside the device to-be-charged 130, which in turn results in abnormality of the device to-be-charged 130.

For example, heat accumulated in the converting circuit 132 may cause heat interference with electronic components near the converting circuit 132, which results in working abnormality of the electronic components. For another example, the heat accumulated in the converting circuit 132 may shorten service life of the converting circuit 132 and the electronic components near the converting circuit 132. For yet another example, the heat accumulated in the converting circuit 132 may cause heat interference with the battery 133, which in turn brings about abnormality of charge and discharge of the battery 133. For still another example, the heat accumulated in the converting circuit 132 may raise temperature of the device to-be-charged 130 and thus influence user experience in the charging process. For still another example, the heat accumulated in the converting circuit 132 may result in short circuit of the converting circuit 132 itself, and as a result, the output voltage of the wireless receiving circuit 131 is directly applied to the battery 133 and causes abnormality of charging. In case that the battery 133 is charged with overvoltage for a long time, explosion of the battery 133 may even occur, thus putting users at risk.

In order to solve the above problems, a wireless charging system is provided in implementations of the disclosure. In the wireless charging system, a wireless charging device and a device to-be-charged can conduct wireless communication. In addition, a transmission power of the wireless charging device can be adjusted according to feedback information of the device to-be-charged, to make the transmission power of a wireless receiving circuit of the device to-be-charged match a present charging stage of the battery. In other words, in the wireless charging system, the wireless charging device and the device to-be-charged can communicate with each other, and the transmission power of the wireless charging device can be adjusted according to feedback information received from the device to-be-charged, such that the output voltage and/or output current of the wireless receiving circuit of the device to-be-charged can meet present charging requirements of the battery, such as present requirements on charging current and/or charging voltage. In the device to-be-charged, the output voltage and/or output current of the wireless receiving circuit can be applied directly to the battery for charging (referred to as "direct charging" hereinafter), which can avoid problems such as energy loss, heating, etc. due to conversion on the output voltage and/or output current of the wireless receiving circuit conducted by the converting circuit described above.

Figure 2:
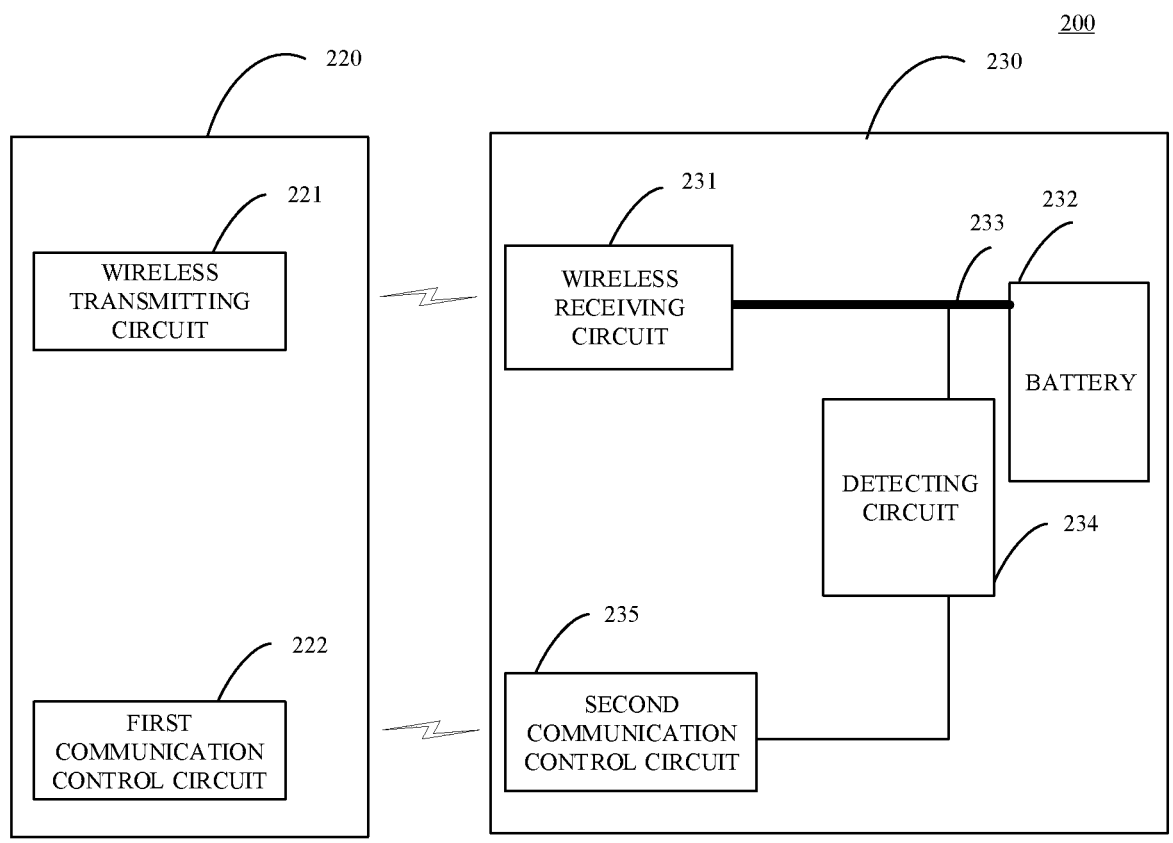
FIG. 2 is a schematic structural diagram of a wireless charging system according to an implementation of the present disclosure.

The following will describe in detail a wireless charging system 200 provided in implementations of the disclosure in conjunction with FIG. 2.

As illustrated in FIG. 2, the wireless charging system 200 in implementations of the disclosure includes a wireless charging device 220 and a device to-be-charged 230. The wireless charging device 220 is configured to charge the device to-be-charged 230.

The wireless charging device 220 includes a wireless transmitting circuit 221 and a first communication control circuit 222. Control function of the first communication control circuit 222 can be achieved by, for instance, a micro control unit (MCU).

The wireless transmitting circuit 221 is configured to transmit an electromagnetic signal. In some examples, the wireless transmitting circuit 221 can include a wireless transmission driving circuit and a transmitting coil or a transmitting antenna (not illustrated in FIG. 2). The wireless transmission driving circuit is configured to generate an AC of high frequency. The transmitting coil or the transmitting antenna can be configured to convert the AC of high frequency into the electromagnetic signal for transmission.

The first communication control circuit 222 is configured to conduct wireless communication with the device to-be-charged 230 in a process that the wireless charging device 220 charges device to-be-charged 230 wirelessly. Specifically, the first communication control circuit 222 is configured to communicate with a second communication control circuit 235 of the device to-be-charged 230. The manner of communication between the first communication control circuit 222 and the second communication control circuit 235 and information exchanged between the first communication control circuit 222 and the second communication control circuit 235 are not limited herein, which will be described in detail hereinafter in conjunction with specific implementations.

The device to-be-charged 230 includes a wireless receiving circuit 231, a battery 232, a detecting circuit 234, and the second communication control circuit 235. Control function of the second communication control circuit 235 can be achieved by, for instance, an MCU, or be cooperatively achieved by the MCU and an application processor (AP) of the device to-be-charged.

The wireless receiving circuit 231 is configured to receive the electromagnetic signal and convert the electromagnetic signal to provide an output voltage and an output current to the battery 232. Specifically, the wireless receiving circuit 231 includes a receiving coil or a receiving antenna (not illustrated in FIG. 2) and a shaping circuit (such as a rectifying circuit and/or a filtering circuit) coupled with the receiving coil and the receiving antenna. The receiving antenna or the receiving coil is configured to convert the electromagnetic signal into an AC. The shaping circuit is configured to convert the AC into the output voltage and the output current of the wireless receiving circuit 231.

It should be noted that, the form of the shaping circuit and the form of the output voltage and the output current of the wireless receiving circuit 231 obtained after processing of the shaping circuit are not limited herein.

In some examples, the shaping circuit can include the rectifying circuit and the filtering circuit. The output voltage of the wireless receiving circuit 231 can be a steady voltage obtained after filtering. In another example, the shaping circuit can include the rectifying circuit. The output voltage of the wireless receiving circuit 231 can be a pulsating waveform voltage obtained after rectification. The pulsating waveform voltage can be applied directly to the battery 232 of the device to-be-charged 230 to charge the battery 232.

It can be understood that, the output current of the wireless receiving circuit 231 can be used for charging the battery 232 in an intermittent manner. Period of the output current of the wireless receiving circuit 231 can vary with frequency of an AC input (such as an AC power grid) into the wireless charging system 200. For instance, frequency corresponding to the period of the output current of the wireless receiving circuit 231 is N or 1/N times (N is a positive integer) of frequency of a power grid. In addition, when the output current of the wireless receiving circuit 231 is used for charging the battery 232 in an intermittent manner, current waveform corresponding to the output current of the wireless receiving circuit 231 can include one pulse or one group of pulses synchronized with the power grid. Compared with a conventional constant direct current (DC), the magnitude of such pulsating voltage or pulsating current changes periodically, which can reduce lithium precipitation of a lithium battery and prolong service life of a battery. In addition, the pulsating voltage or pulsating current is beneficial to reducing polarization effect of the battery, increasing charging speed, and reducing heating of the battery, thereby ensuring safety and reliability in charging of the device to-be-charged.

The detecting circuit 234 is configured to detect an output voltage and/or an output current of the wireless receiving circuit 231. In some embodiments, the detecting circuit 234 can include a voltage detecting circuit and a voltage detecting circuit.

The voltage detecting circuit is configured to sample the output voltage of the wireless receiving circuit 231 and transmit sampled voltage value to the second communication control circuit 235. In some examples, the voltage detecting circuit is configured to sample the output voltage of the wireless receiving circuit 231 in a series-voltage division manner.

The current detecting circuit is configured to sample the output current of the wireless receiving circuit 231 and transmit sampled current value to the second communication control circuit 235. In some examples, the current detecting circuit is configured to sample the output current of the wireless receiving circuit 231 via a current sensing resistor and a current detector.

The second communication control circuit 235 is configured to conduct wireless communication with the first communication control circuit 222, to transmit to the first communication control circuit 222 the output voltage and/or the output current of the wireless receiving circuit 231 detected by the detecting circuit 234, whereby the first communication control circuit 222 adjusts a transmission power of the wireless transmitting circuit 221 to meet charging requirements of the battery 232.

In other words, the second communication control circuit 235 is configured to conduct wireless communication with the first communication control circuit 222 according to the output voltage and/or the output current of the wireless receiving circuit 231 detected by the detecting circuit 234, whereby the first communication control circuit 222 adjusts the transmission power of the wireless transmitting circuit 221 to make the output voltage and/or the output current of the wireless receiving circuit 231 meet requirements on charging of the battery 232. The charging requirements include requirements on charging current and/or requirements on charging voltage of the battery 232.

In other words, the second communication control circuit 235 is configured to conduct wireless communication with the first communication control circuit 222, to transmit to the first communication control circuit 222 the output voltage and/or the output current of the wireless receiving circuit 231 detected by the detecting circuit 234, whereby the first communication control circuit 222 adjusts the transmission power of the wireless transmitting circuit 231, to make the output voltage and/or output current of the wireless receiving circuit 231 match a present charging stage of the battery 232.

In other words, the second communication control circuit 235 is configured to conduct wireless communication with the first communication control circuit 222 according to the output voltage and/or the output current of the wireless receiving circuit 231 detected by the detecting circuit 234, whereby the first communication control circuit 222 adjusts the transmission power of the wireless transmitting circuit 221 to make the output voltage and/or the output current of the wireless receiving circuit 231 meet requirements on charging of the battery 232 in at least one of a trickle charging stage, a constant-voltage charging stage, and a constant-current charging stage.

In other words, the second communication control circuit 235 can be configured to conduct wireless communication with the first communication control circuit 222 according to the output voltage and/or output current of the wireless receiving circuit 231 detected by the detecting circuit 234, whereby the first communication control circuit 222 can conduct constant-voltage and/or constant current control on the charging process of the battery 232 by adjusting the transmission power of the wireless transmitting circuit 221.

The charging process of the battery can include at least one of the trickle charging stage, the constant-voltage charging stage, and the constant-current charging stage.

In terms of conducting wireless communication with the first communication control circuit 222, to transmit to the first communication control circuit 222 the output voltage and/or the output current of the wireless receiving circuit 231 detected by the detecting circuit 234, whereby the first communication control circuit 222 adjusts the transmission power of the wireless transmitting circuit 221 according to the output voltage and/or the output current of the wireless receiving circuit 231, the second communication control circuit 235 is configured to: in the trickle charging stage of the battery 232, conduct wireless communication with the first communication control circuit 222 according to the output voltage and/or the output current of the wireless receiving circuit 231 detected by the detecting circuit 234, whereby the first communication control circuit 222 adjusts the transmission power of the wireless transmitting circuit 221 to make the output current of the wireless receiving circuit 231 match a charging current corresponding to the trickle charging stage (or to make the output current of the wireless receiving circuit 231 meet requirements on charging current of the battery 232 in the trickle charging stage).

For example, the charging current corresponding to the trickle charging stage is 1 A. When the battery 232 is in the trickle charging stage, the output current of the wireless receiving circuit 231 can be detected in real time by the detecting circuit 234. When the output current of the wireless receiving circuit 231 is larger than 1 A, the second communication control circuit 235 can communicate with the first communication control circuit 222, whereby the first communication control circuit 222 adjusts the transmission power of the wireless transmitting circuit 221 to make the output current of the wireless receiving circuit 231 returns to 1 A.

In terms of conducting wireless communication with the first communication control circuit 222, to transmit to the first communication control circuit 222 the output voltage and/or the output current of the wireless receiving circuit 231 detected by the detecting circuit 234, whereby the first communication control circuit 222 adjusts the transmission power of the wireless transmitting circuit 221 according to the output voltage and/or the output current of the wireless receiving circuit 231, the second communication control circuit 235 is configured to: in the constant-voltage charging stage of the battery 232, conduct wireless communication with the first communication control circuit 222 according to the output voltage and/or the output current of the wireless receiving circuit 231 detected by the detecting circuit 234, whereby the first communication control circuit 222 adjusts the transmission power of the wireless transmitting circuit 221 to make the output voltage of the wireless receiving circuit 231 match a charging voltage corresponding to the constant-voltage charging stage (or to make the output voltage of the wireless receiving circuit 231 meet requirements on charging voltage of the battery 232 in the constant-voltage charging stage).

For example, the charging voltage corresponding to the constant-voltage charging stage is 5V. When the battery 232 is in the constant-voltage charging stage, the output voltage of the wireless receiving circuit 231 can be detected in real time by the detecting circuit 234. When the output voltage of the wireless receiving circuit 231 is lower than 5V, the second communication control circuit 235 can communicate with the first communication control circuit 222, whereby the first communication control circuit 222 adjusts the transmission power of the wireless transmitting circuit 221 to make the output voltage of the wireless receiving circuit 231 returns to 5V. There may be many reasons for change in the output voltage of the wireless receiving circuit 231, which is not limited herein. For instance, transmission of an electromagnetic signal between the wireless transmitting circuit 221 and the wireless receiving circuit 231 is interfered, which results in lower efficiency in energy conversion and thus makes the output voltage of the wireless receiving circuit 231 lower than 5V.

In terms of conducting wireless communication with the first communication control circuit 222, to transmit to the first communication control circuit 222 the output voltage and/or the output current of the wireless receiving circuit 231 detected by the detecting circuit 234, whereby the first communication control circuit 222 adjusts the transmission power of the wireless transmitting circuit 221 according to the output voltage and/or the output current of the wireless receiving circuit 231, the second communication control circuit 235 is configured to: in the constant-current charging stage of the battery 232, conduct wireless communication with the first communication control circuit 222 according to the output voltage and/or the output current of the wireless receiving circuit 231 detected by the detecting circuit 234, whereby the first communication control circuit 222 adjusts the transmission power of the wireless transmitting circuit 221 to make the output current of the wireless receiving circuit 231 match a charging current corresponding to the constant-current charging stage (or to make the output current of the wireless receiving circuit 231 meet requirements on charging current of the battery 232 in the constant-current charging stage).

For example, the charging current corresponding to the constant-current charging stage is 2 A. When the battery 232 is in the constant-current charging stage, the output current of the wireless receiving circuit 231 can be detected in real time by the detecting circuit. When the output current of the wireless receiving circuit 231 is smaller than 2 A, the second communication control circuit 235 can communicate with the first communication control circuit 222, whereby the first communication control circuit 222 adjusts the transmission power of the wireless transmitting circuit 221 to make the output current of the wireless receiving circuit 231 returns to 2 A. There may be many reasons for change in the output current of the wireless receiving circuit 231, which is not limited herein. For instance, transmission of an electromagnetic signal between the wireless transmitting circuit 221 and the wireless receiving circuit 231 is interfered, which results in lower efficiency in energy conversion and thus makes the output current of the wireless receiving circuit 231 smaller than 2 A.

It should be noted that, the constant-current charging stage or the constant-current stage referred to herein does not require that the charging current remain completely constant, and may be, for example, a peak value (that is, peak current) or an average value of the charging current remaining constant within a certain time period. Practically, in the constant-current charging stage, a multi-stage constant current charging manner is usually adopted for charging.

Multi-stage constant current charging can include N constant-current stages, where N is an integer not less than two (N>=2). In the multi-stage constant current charging, a first stage of charging begins with a pre-determined charging current. The N constant-current stages of the multi-stage constant current charging are executed in sequence from the first stage to the Nth stage. When a previous constant-current stage ends and a next constant-current stage begins, the peak value or average value of a pulsating waveform current may decrease. When a voltage of the battery reaches a threshold of charging cut-off voltage, the multi-stage constant current charging proceeds to a subsequent constant-current stage, that is, the previous constant-current stage ends and the next constant-current stage begins. Current conversion between two adjacent constant-current stages may be gradual or in a step-like manner.

In implementations of the present disclosure, the device to-be-charged can be a terminal. The "terminal" can include but is not limited to a device coupled via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or other data connection lines or network connection lines. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with other communication terminals. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and a conventional laptop or a handheld receiver or other electronic devices equipped with radio telephone transceiver. In addition, in implementations of the present disclosure, the device to-be-charged or terminal can also include a power bank. The power bank can be configured to be charged by an adaptor and thus store energy to charge other electronic devices.

The manner and order of communication between the wireless charging device 220 and the device to-be-charged 230 are not limited herein.

In some examples, the wireless communication between the wireless charging device 220 and the device to-be-charged 230 (or between the second communication control circuit 235 and the first communication control circuit 222) is a one-way wireless communication.

For example, during wireless charging of the battery 232, it can be specified that the device to-be-charged 230 is an initiator of communication and the wireless charging device 220 is a receiver of communication. Exemplarily, in the constant-current charging stage of the battery, the device to-be-charged 230 can detect in real time the charging current of the battery 232 (that is, the output current of the wireless receiving circuit 231) through the detecting circuit 234. When the charging current of the battery 232 does not match the present charging stage of the battery, the device to-be-charged 230 can send adjustment information to the wireless charging device 220 to instruct the wireless charging device 220 to adjust the transmission power of the wireless transmitting circuit 221.

In some implementations, the wireless communication between the wireless charging device 220 and the device to-be-charged 230 (or between the second communication control circuit 235 and the first communication control circuit 222) is a two-way wireless communication. The two-way wireless communication generally requires that the receiver send response information to the initiator after receiving communication request initiated by the initiator. Two-way communication mechanism can make communication safer.

Description above does not limit master-slave relationship between the wireless charging device 220 (or the first communication control circuit 222 of the wireless charging device 220) and the device to-be-charged 230 (or the second communication control circuit 235 of the device to-be-charged 230). That is to say, any one of the wireless charging device 220 and the device to-be-charged 230 can function as a master device to initiate a two-way communication, and correspondingly the other one of the wireless charging device 220 and the device to-be-charged 230 can function as a slave device to make a first response or a first reply to the communication initiated by the master device. Optionally, the master device and the slave device can be determined by comparing link states between the wireless charging device 220 and the device to-be-charged 230. For example, suppose a wireless link in which the wireless charging device 220 sends information to the device to-be-charged 230 is an uplink and a wireless link in which the device to-be-charged 230 sends information to the wireless charging device 220 is a downlink. When the uplink is of higher quality, the wireless charging device 220 can be determined as the master device of communication. When the downlink is of higher quality, the device to-be-charged 230 can be determined as the master device of communication.

The manner in which the two-way communication between the wireless charging device 220 and the device to-be-charged 230 is implemented is not limited herein. That is to say, any one of the wireless charging device 220 and the device to-be-charged 230 can function as the master device to initiate the two-way communication, and correspondingly the other one of the wireless charging device 220 and the device to-be-charged 230 can function as the slave device to make the first response or the first reply to the communication initiated by the master device. Besides, the master device can make a second response to the first response or the first reply of the slave device, and as such, the master device and the slave device complete one communication negotiation.

The master device can make the second response to the first response or the first reply of the slave device as follows. The master device receives from the slave device the first response or the first reply to the communication and makes the second response to the first response or the first reply of the slave device.

The master device can also make the second response to the first response or the first reply of the slave device as follows. When the master device fails to receive from the slave device the first response or the first reply to the communication within a preset time period, the master device can still make the second response to the first response or the first reply made by the slave device.

In some examples, after the device to-be-charged 230, as the master device, initiates the communication and the wireless charging device 220, as the slave device, makes the first response or the first reply to the communication initiated by the master device, it can be considered that the wireless charging device 220 and the device to-be-charged 230 have complete a communication negotiation without requiring the device to-be-charged 230 to make the second response to the first response or the first reply of the wireless charging device 220.

The mode of wireless communication between the first communication control circuit 222 of the wireless charging device 220 and the second communication control circuit 235 of the device to-be-charged 230 is not limited herein. As an implementation, the first communication control circuit is configured to conduct wireless communication with the second communication control circuit based on Bluetooth, wireless fidelity (Wi-Fi), short-range wireless communication based on high carrier frequency, optical communication, ultrasonic communication, ultra-wideband communication, and mobile communication.

In one implementation, the first communication control circuit 222 includes at least one of the following modules for wireless communication with the second communication control circuit 235: a Bluetooth module, a Wi-Fi module, a high carrier frequency based short-range wireless communication module, an optical communication module, an ultrasonic communication module, an ultra-wideband communication module, and a mobile communication module.

In one implementation, the high carrier frequency based short-range wireless communication module includes an IC chip module with an EHF antenna inside. Optionally, the high carrier frequency is 60 GHz.

In one implementation, the optical communication module includes an infrared communication module, which can use infrared to transmit information.

In one implementation, the mobile communication module can transmit information based on mobile communication protocols such as 5G communication protocol, 4G communication protocol, or 3G communication protocol.

Accordingly, the second communication control module 235 includes at least one of the following modules for wireless communication with the first communication control circuit 222: a Bluetooth module, a Wi-Fi module, a high carrier frequency based short-range wireless communication module, an optical communication module, an ultrasonic communication module, an ultra-wideband communication module, and a mobile communication module.

As such, wireless communication between the first communication control circuit 222 and the second communication control module 235 can be conducted based on at least one of: Bluetooth communication, Wi-Fi communication, short-range wireless communication based on high carrier frequency, optical communication, ultrasonic communication, ultra-wideband communication, and mobile communication.

In implementations of the disclosure, the first communication control circuit 222 and the second communication control module 235 can support one or more wireless communication modes. In various implementation, wireless communication includes standard communication and non-standard communication. Examples of standard wireless communication includes, for example: link protocol, such as Bluetooth, IEEE 802.11 (wireless LANs), 802.15 (WPANs), 802.16 (WiMAX), 802.20 mobile wireless wideband access; cellular protocol (mobile communication protocol), such as 5G standard protocol, LTE, CDMA, GSM; Zigbee and ultra wideband (UWB) technology. These protocols support radio frequency communication, and some support infrared communication. Other wireless communication forms such as ultrasound communication, optical communication, short-range wireless communication based on high carrier frequency can also be adopted. It should be understood that the above wireless communication standard include past and existing standards. Without departing from the scope of this application, future versions and future standards of these standards are also included.

In implementations of the disclosure, the first communication control circuit 222 and the second communication control module 235 can also determine the wireless communication mode to be adopted according to signal strength of various wireless communication modes detected. For example, when Wi-Fi is used for wireless communication, if it is detected that the Wi-Fi signal is weak, then switch to use other wireless communication mode.

By adopting the wireless communication provided herein, information on voltage, current, or power entering the battery 232 can be transmitted to the wireless charging device 220, whereby the wireless charging device 220 can adjust the transmission power in real time according to the information received. As such, reliability of communication and safety of charging can be improved. Compared with the related art (such as Qi standard) in which communication is conducted by coupling to coils of a wireless receiving circuit by signal modulation, reliability of communication can be improved, and voltage ripple, which is caused by signal coupling based communication and affects the voltage process of a converting circuit or a Step-down circuit of the device to-be-charged, can be avoided.

As pointed above, during wireless charging, the second communication control circuit 235 can be configured to conduct the wireless communication with the first communication control circuit 222 according to the output voltage and/or the output current of the wireless receiving circuit 231 detected by the detecting circuit 234, whereby the first communication control circuit 222 adjusts the transmission power of the wireless transmitting circuit 221. However, contents communicated between the first communication control circuit 222 and the second communication control circuit 235 is not limited herein.

As an example, the second communication control circuit 235 is configured to send to the first communication control circuit 222 the output voltage and/or the output current of the wireless receiving circuit 231 detected by the detecting circuit 234. In addition, the second communication control circuit 235 can be further configured to send battery-state information to the first communication control circuit 222. The battery-state information includes a present power and/or a present voltage of the battery 232 of the device to-be-charged 230. The first communication control circuit 222 can determine the present charging stage of the battery 232 according to the battery-state information, to further determine a target charging voltage and/or a target charging current that matches the present charging stage of the battery 232. Then the first communication control circuit 222 can compare the output voltage and/or the output current of the wireless receiving circuit 231 received from the second communication control circuit 235 with the above target charging voltage and/or target charging current to determine whether the output voltage and/or the output current of the wireless receiving circuit 231 matches the present charging stage of the battery 232. When the output voltage and/or the output current of the wireless receiving circuit 231 does not match the present charging stage of the battery 232, the first communication control circuit 222 can adjust the transmission power of the wireless transmitting circuit 221 until the output voltage and/or the output current of the wireless receiving circuit 231 matches the present charging stage of the battery 232.

As another example, the second communication control circuit 235 is configured to send adjustment information to the first communication control circuit 222 to instruct the first communication control circuit 222 to adjust the transmission power of the wireless transmitting circuit 221. For example, the second communication control circuit 235 can instruct the first communication control circuit 222 to increase the transmission power of the wireless transmitting circuit 221. For another example, the second communication control circuit 235 can instruct the first communication control circuit 222 to reduce the transmission power of the wireless transmitting circuit 221. Specifically, the wireless charging device 220 can set the transmission power of the wireless transmitting circuit 221 to have multiple grades. Each time the first communication control circuit 222 receives the adjustment information, the first communication control circuit 222 adjusts the transmission power of the wireless transmitting circuit 221 by one grade until the output voltage and/or the output current of the wireless receiving circuit 231 matches the present charging stage of the battery 232.

Besides the above communication content, the first communication control circuit 222 and the second communication control circuit 235 can also be configured to exchange other types of information communicated. In some examples, the first communication control circuit 222 and the second communication control circuit 235 can exchange information for safety protection, abnormality detection, or fault handling, such as temperature information of the battery 232, information indicative of over-voltage protection or over-current protection, etc., or power-delivery efficiency information (for indicating efficiency in power delivery between the wireless transmitting circuit 221 and the wireless receiving circuit 231).

For example, when the temperature of the battery 232 is excessively high, the first communication control circuit 222 and/or the second communication control circuit 235 can control a charging loop to a protection state, such as controlling the charging loop to stop the wireless charging. For another example, after receiving the information indicative of over-voltage protection or over-current protection from the second communication control circuit 235, the first communication control circuit 222 can reduce the transmission power, or control the wireless transmitting circuit 221 to stop working. For yet another example, after receiving the power-delivery efficiency information from the second communication control circuit 235, the first communication control circuit 222 can control the wireless transmitting circuit 221 to stop working if power-delivery efficiency is lower than a preset threshold and notify user of the event. Exemplarily, the fact that the power-delivery efficiency is excessively low can be displayed via a display screen, or be indicated by an indicator lamp in order for the user to adjust wireless charging environment.

In some examples, the first communication control circuit 222 and the second communication control circuit 235 can be configured to exchange other types of information for adjusting the transmission power of the wireless transmitting circuit 221, such as the temperature information of the battery 232, information indicative of a peak value or an average value of the output voltage and/or output current of the wireless receiving circuit 231, information indicative a peak value or an average value of the current in the first charging channel 233, the power-delivery efficiency information (indicative of efficiency in power delivery between the wireless transmitting circuit 221 and the wireless receiving circuit 231), etc.

For instance, the second communication control circuit 235 can send the power-delivery efficiency information to the first communication control circuit 222. The first communication control circuit 222 can be further configured to determine an adjustment range of the transmission power of the wireless transmitting circuit 221 according to the power-delivery efficiency information. Specifically, when the power-delivery efficiency information indicates that the efficiency in power delivery between the wireless transmitting circuit 221 and the wireless receiving circuit 231 is low, the first communication control circuit 222 can increase the adjustment range of the transmission power of the wireless transmitting circuit 221 to make the transmission power of the wireless transmitting circuit 221 reach promptly a target power.

For another instance, when the output voltage and/or the output current of the wireless receiving circuit 231 is a pulsating waveform voltage and/or a pulsating waveform current, the second communication control circuit 235 can send at least one of the information indicative of a peak value or an average value of the output voltage of the wireless receiving circuit 231 and the information indicative of a peak value or an average value of the output current of the first charging channel 233 to the first communication control circuit 222. The first communication control circuit 222 can determine whether the peak value or the average value of the output voltage and/or the output current of the wireless receiving circuit 231 matches the present charging stage of the battery. When the peak value or the average value of the output voltage and/or the output current of the wireless receiving circuit 231 does not match the present charging stage of the battery, the first communication control circuit 222 will adjust the transmission power of the wireless transmitting circuit 221.

For yet another instance, the second communication control circuit 235 can send the temperature information of the battery 232 to the first communication control circuit 222. When a temperature of the battery 232 is excessively high, the first communication control circuit 222 will reduce the transmission power of the wireless transmitting circuit 221 to decrease the output current of the wireless receiving circuit 231, thereby reducing the temperature of the battery 232.

Contents communicated between the second communication control circuit 235 and the first communication control circuit 222 can be contents of file transfer.

Compared with the related art, the wireless charging device and the device to-be-charged can communicate with each other as mentioned above, in this way, there is no need to use a transmitting coil and a receiving coil, which are used for charging, to participate in communication, thus the problem of ripples in output voltage caused by coil communication can be solved. In terms of the voltage ripples occurred when the wireless receiving coil outputs, if the voltage ripples are not handled effectively, it may lead to wireless charging security problems and security risks. With aid of the technical solutions provided herein, voltage ripples can be eliminated, and accordingly, circuits for handling voltage ripples can be omitted, as such, the complexity of the charging circuit of the device to-be-charged can be reduced, the charging efficiency can be improved, the setting space of the circuit can be saved, and the cost can be reduced. The battery can be charged through the first charging channel, where the first charging channel is provided with a Step-down circuit. Since the device to-be-charged feeds back to the wireless charging device information on the voltage, current, or power entering the battery, the wireless charging device can adjust the transmission power in real time. Since voltage ripples are eliminated and the Step-down circuit can be implemented with a half-voltage circuit, complexity of the circuit can be further reduced, which is be beneficial to temperature control and charging efficiency improvement.

Figure 3:
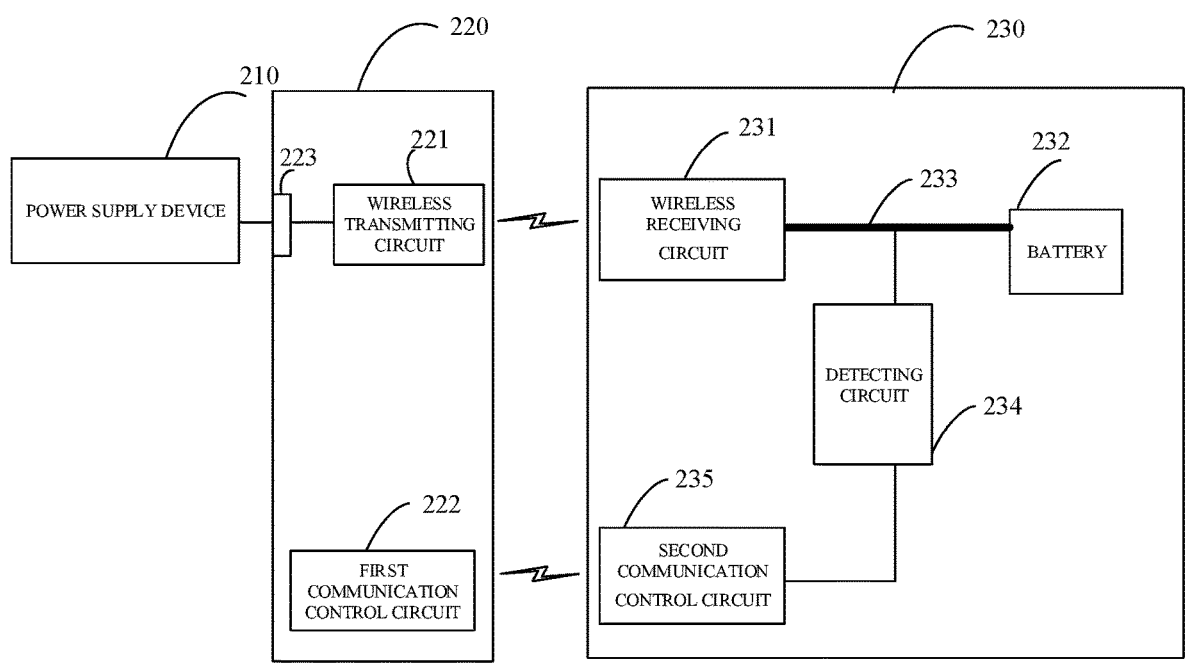
FIG. 3 is a schematic structural diagram of a wireless charging system according to another implementation of the present disclosure.

As illustrated in FIG. 3, the wireless charging device 220 may further includes a charging interface 233. The wireless transmitting circuit 221 is further configured to receive the output voltage and the output current of the power supply device 210 through the charging interface 233, and generate the electromagnetic signal according to the output voltage and output current of the power supply device 210.

The type of the power supply device 210 is not limited herein. For example, the power supply device 210 can be a power adapter, a power bank, or a computer.

The type of the charging interface 223 is not specifically limited herein. In some implementations, the charging interface 223 is a USB interface. The USB interface can be, for example, a USB 2.0 interface, a micro USB interface, or a USB TYPE-C interface. Alternatively, in other implementations, the charging interface 223 can also be a lightning interface, or other types of parallel interface and/or serial interface that is used for charging.

The manner of communication between the first communication control circuit 222 and the power supply device 210 is no limited herein. As an example, the first communication control circuit 222 can be coupled with and communicate with the power supply device 210 via another communication interface other than the charging interface. As another example, the first communication control circuit 222 can communicate with the power supply device 210 in a wireless manner. For example, the first communication control circuit 222 can conduct near field communication (NFC) with the power supply device 210. As yet another example, the first communication control circuit 222 can communicate with the power supply device 210 via the charging interface 223 without providing any extra communication interface or another wireless communication module, which can simplify the implementation of the wireless charging device 220. For instance, the charging interface 223 is a USB interface. The first communication control circuit 222 can communicate with the power supply device 210 via a data line (such as a D+ line and/or a D− line) of the USB interface. For another instance, the charging interface 223 is a USB interface supporting a power delivery (PD) communication protocol (such as the USB TYPE-C interface). The first communication control circuit 222 can communicate with the power supply device 210 based on the PD communication protocol.

The power supply device 210 can be a normal power supply device with a fixed output power, or can be the power supply device with an adjustable output power provided herein. In the following, the power supply device 210 will be described below first as a power supply device with an adjustable output power and then as a power supply device with a fixed output power.

The power supply device with an adjustable output power may be provided with a voltage feedback loop and a current feedback loop and therefore, can adjust its output voltage and/or output current according to actual needs. The power supply device 210 may be further equipped with a communication function. The first communication control circuit 222 is further configured to communicate with the power supply device 210 to negotiate the output power of the power supply device 210.

As pointed above, the wireless charging device 220 provided herein can adjust continuously the transmission power of the wireless transmitting circuit 221 to make the output voltage and/or the output current of the wireless receiving circuit 231 matches the present charging stage of the battery 232. The manner in which the transmission power of the wireless transmitting circuit 221 is adjusted is not limited herein. As an example, the first communication control circuit 222 can communicate with a power supply device 210 for adjustment of an output voltage and/or an output current of the power supply device 210, so as to adjust the transmission power of the wireless transmitting circuit 221. As another example, the first communication control circuit 222 is configured to adjust an amount of power extracted by the wireless transmitting circuit 221 from a maximum output power provided by the power supply device 210 to adjust the transmission power of the wireless transmitting circuit 221. In the following, the manner in which the transmission power of the wireless transmitting circuit 221 is adjusted will be elaborated with reference to FIG. 4 and FIG. 5.

Figure 4:
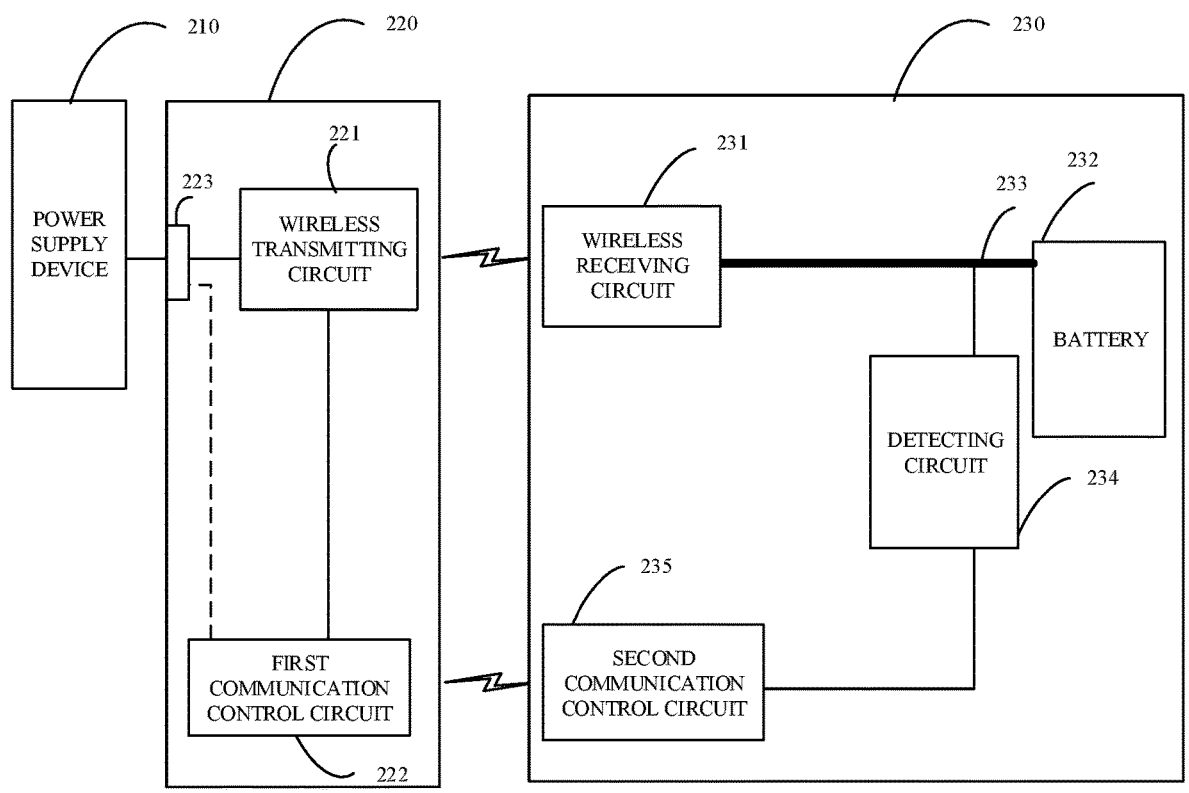
FIG. 4 is a schematic structural diagram of a wireless charging system according to another implementation of the present disclosure.

As illustrated in FIG. 4, in one implementation, the first communication control circuit 221 can communicate with the power supply device 210 to negotiate the maximum output power of the power supply device 210. In a process that the wireless transmitting circuit 221 conduct wireless charging on the device to-be-charged 230 according to the maximum output power of the power supply device 210, the first communication control circuit 221 can adjust an amount of power extracted by the wireless transmitting circuit 221 from a maximum output power, to adjust the transmission power of the wireless transmitting circuit 221.

In this implementation, the first communication control circuit 222 communicates with the power supply device 210 with adjustable output power to negotiate the maximum output power of the power supply device 210. After negotiation is completed, the power supply device 210 provides an output voltage and an output current to the wireless charging device 220 according to the maximum output power. During charging, the first communication control circuit 222 extracts a certain amount of power from the maximum output power for wireless charging according to actual needs. In other words, in implementations of the disclosure, control on adjustment of the transmission power of the wireless transmitting circuit 221 is allotted to the first communication control circuit 222. As such, the first communication control circuit 222 can adjust the transmission power of the wireless transmitting circuit 221 immediately after receiving feedback information from the device to-be-charged 230, which has advantages of high adjusting speed and high efficiency.

The manner in which the first communication control circuit 222 adjusts the transmission power of the wireless transmitting circuit 221 is not limited herein. For example, a power adjusting circuit can be disposed inside the first communication control circuit 222, inside the wireless transmitting circuit 221, or between the first communication control circuit 222 and the wireless transmitting circuit 221. The power adjusting circuit can be coupled with the transmitting coil or the transmitting antenna to adjust power received by the transmitting coil or the transmitting antenna. The power adjusting circuit can include, for example, a pulse width modulation (PWM) controller and a switch component. The first communication control circuit 222 can adjust the transmission power of the wireless transmitting circuit 221 by adjusting a duty cycle of a control signal transmitted by the PWM controller and/or by controlling switch frequency of the switch component.

It should be noted that, alternatively, in the implementation illustrated in FIG. 4, the power supply device 210 can also output a constant and high output power (such as 40 W) directly. In this way, the first communication control circuit 222 can adjust directly the amount of power extracted by the wireless transmitting circuit 221 from such constant output power of the power supply device 210 without negotiating with the power supply device 210 the maximum output power of the power supply device 210.

Figure 5:
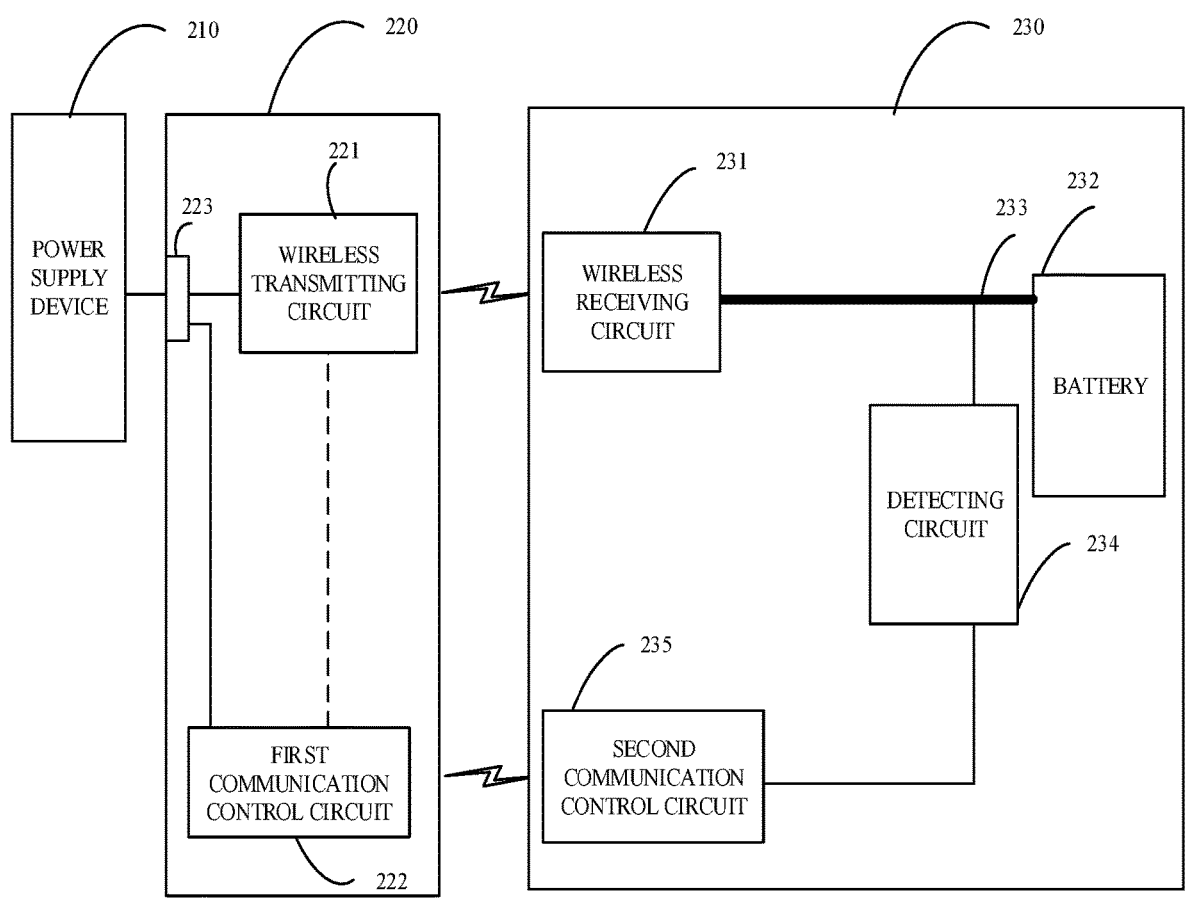
FIG. 5 is a schematic structural diagram of a wireless charging system according to another implementation of the present disclosure.

As illustrated in FIG. 5, in some implementations, the first communication control circuit 221 can communicate with the power supply device 210 to adjust the output voltage and/or output current of the power supply device 210, so as to adjust the transmission power of the wireless transmitting circuit 221. In some other implementations, the first communication control circuit 222 can be coupled with the wireless transmitting circuit 221 to control the wireless transmitting circuit 221 to work, or control the wireless transmitting circuit 221 to stop working when the wireless charging is abnormal. Alternatively, the first communication control circuit 222 may not be coupled with the wireless transmitting circuit 221.

Different from FIG. 4, in FIG. 5, control on adjustment of the transmission power of the wireless transmitting circuit 221 is allotted to the power supply device 210, and the power supply device 210 is configured to adjust the transmission power of the wireless transmitting circuit 221 by changing the output voltage and/or output current. In such an adjusting manner, advantageously, the power supply device 210 can provide the exact amount of power required by the wireless charging device 220, and there is no waste of power.

In the implementation illustrated in FIG. 5, the wireless charging device 220 can determine actively whether it is necessary to adjust the output voltage and/or the output current of the power supply device 210. In another example, the wireless charging device 220 can function as a "bridge" of communication between the power supply device 210 and the device to-be-charged 230 and forward information between the power supply device 210 and the device to-be-charged 230.

For example, the first communication control circuit 222 communicates with the device to-be-charged 230 during wireless charging to determine whether it is necessary to adjust the output voltage and/or the output current of the power supply device 210. When it is necessary to adjust the output voltage and/or the output current of the power supply device 210, the first communication control circuit 222 communicates with the power supply device 210 to instruct the power supply device 210 to adjust the output voltage and/or the output current of the power supply device 210.

For another example, the first communication control circuit 222 of the wireless charging device 220 conducts wireless communication with the device to-be-charged 230 during wireless charging to acquire adjustment information. The adjustment information is for instructing adjustment of the output voltage and/or the output current of the power supply device 210. The first communication control circuit 222 communicates with the power supply device 210 to send the adjustment information to the power supply device 210, whereby the power supply device 210 adjusts the output voltage and/or the output current of the power supply device according to the adjustment information.

It should be understood that, similar to the manner of communication between the wireless charging device 220 and the device to-be-charged 230, the communication between the wireless charging device 220 (or the first communication control circuit 222) and the power supply device 210 can be a one-way communication or a two-way communication and is not limited herein.

Figure 6:
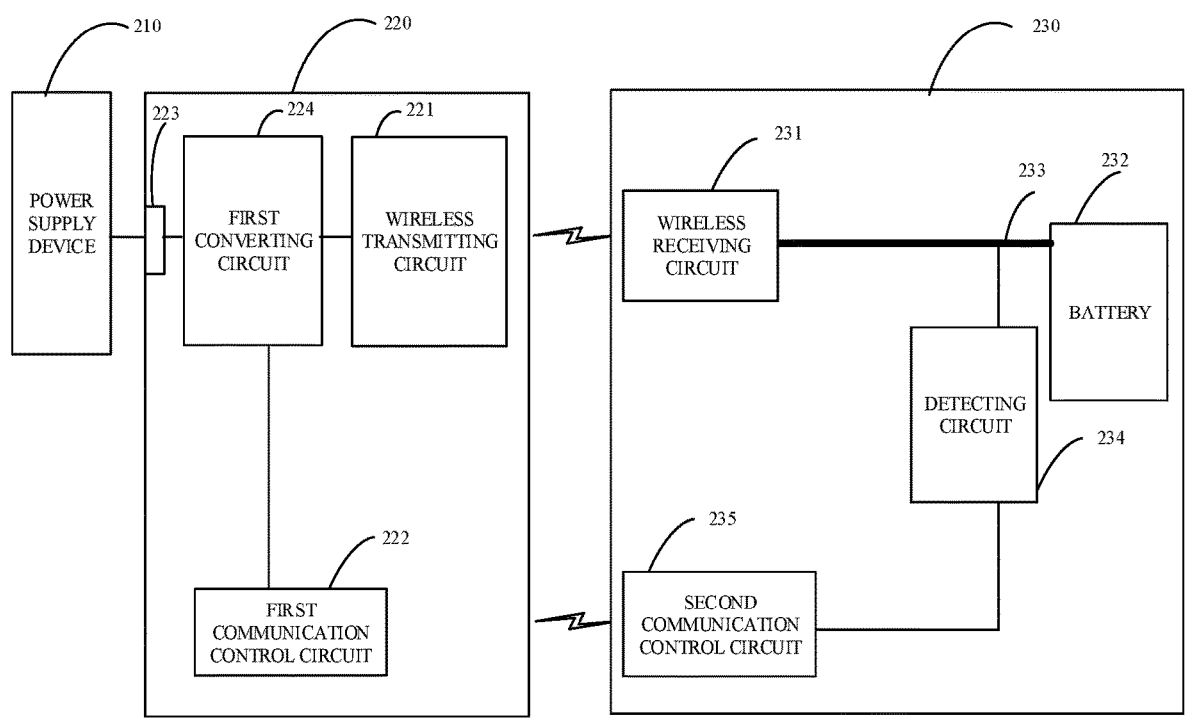
FIG. 6 is a schematic structural diagram of a wireless charging system according to another implementation of the present disclosure.

As illustrated in FIG. 6, the wireless charging device 220 provided herein may further includes a first converting circuit 234. The first converting circuit 234 is configured to receive and convert the output voltage and the output current of the power supply device 210. The wireless transmitting circuit 221 is further configured to generate the electromagnetic signal according to the output voltage and the output current subjected to conversion (that is, a converted voltage and a converted current). In terms of adjusting the transmission power of the wireless transmitting circuit 221, the first communication control circuit 222 is configured to: adjust the voltage and/or current subjected to conversion of the first converting circuit 224 to adjust the transmission power of the wireless transmitting circuit 221.

As mentioned above, the wireless charging device 220 provided herein can continuously adjust the transmission power of the wireless transmitting circuit 221 during charging, to make the output voltage and/or output current of the wireless receiving circuit 231 match a present charging stage of the battery 232. The manner in which the transmission power of the wireless transmitting circuit 221 is adjusted is not limited herein. For example, when the power supply device 210 provided herein is a normal power supply device 210 with a fixed output power, the first communication control circuit 222 can adjust the output voltage and/or output current of the first converting circuit 224 to adjust the transmission power of the wireless transmitting circuit 221, this improves the versatility of the wireless charging device 220 to be applied to the existing common power supply device 210. The first converting circuit 224 can include for example a pulse width modulation (PWM) controller and a switch component. The first communication control circuit 222 can adjust the transmission power of the wireless transmitting circuit 221 by adjusting a duty cycle of a control signal transmitted by the PWM controller and/or by adjusting the output voltage and/or output current of the first converting circuit through controlling switch frequency of the switch component.

Optionally, as illustrated in FIG. 6, the first converting circuit 224 can receive the output voltage and output current from the power supply device 210 through the charging interface 233. For example, when the power supply device 210 is a normal power supply device, the wireless charging device 220 provided herein can be coupled with a normal power supply device through the charging interface 233. During wireless charging, the first communication control circuit 222 can control the first converting circuit 224 to work, and adjust the output voltage and/or output current of the first converting circuit 224 according to feedback information of the device to-be-charged 230, whereby the transmission power of the wireless transmitting circuit 222 meets charging requirements of the battery 232. Such adjustment manner is similar to the alternative manner illustrated in FIG. 4 and here, control on adjustment of the transmission power of the wireless transmitting circuit 221 is also allotted to the first communication control circuit 222, and the first communication control circuit 222 is configured to adjust the transmission power of the wireless transmitting circuit 221 upon receiving the feedback information of the device to-be-charged 230. Such adjustment has advantages of fast adjustment speed and high efficiency, for example.

In addition, it should be understood that, the output current of the power supply device 210 can be a constant DC, a pulsating DC, or an AC and is not limited herein.

The situation where the wireless charging device 220 is coupled with the power supply device 210 to receive power from the power supply device 210 has been described, the present disclosure is not limited to such situation however. For example, The wireless charging device 220 can also be integrated with functions similar to an adapter, thus, it is possible for the wireless charging device 220 to convert directly an external input AC (e.g. mains supply) into the above electromagnetic signal. For example, a function similar to an adapter can be integrated into a wireless transmitting circuit 221 of a wireless charging device 220, for example, the wireless transmitting circuit 221 can be integrated with a rectifier circuit, a primary filter circuit and/or a transformer. In this way, the wireless transmitting circuit 221 can be used to receive external input AC (such as 220V AC, also known as mains supply or commercial electricity), according to which electromagnetic signals can be generated.

In this implementation, a function similar to an adaptor is integrated into the wireless charging device 220, which makes it unnecessary for the wireless charging device 220 to acquire power from an external power supply device, thus improves the integration of the wireless charging device 220, and decreases the number of components required for wireless charging.

In some implementations, the wireless charging device 220 is operable in a first wireless charging mode or in a second wireless charging mode, and a charging speed at which the wireless charging device 220 charges the device to-be-charged 230 in the first wireless charging mode is higher than in the second wireless charging mode. In other words, compared with the wireless charging device 220 working in the second wireless charging mode, the wireless charging device 220 working in the first wireless charging mode takes less time to fully charge a battery of the same capacity of the device to-be-charged 230.

The second wireless charging mode can be referred to as a normal wireless charging mode and can be, for example, a conventional wireless charging mode based on the QI standard, the PMA standard, or the A4WP standard. The first wireless charging mode can be referred to as a quick wireless charging mode. The normal wireless charging mode can refer to a wireless charging mode in which the wireless charging device 220 has a low transmission power (usually lower than 15 W, and the commonly used transmission power is 5 W or 10 W). In the normal wireless charging mode, it usually takes several hours to fully charge a battery of high capacity (such as 3000 mA). However, in the quick wireless charging mode, the transmission power of the wireless charging device 220 is relatively high (usually higher than or equal to 15 W). Compared with the normal wireless charging mode, in the quick wireless charging mode, the wireless charging device 220 can fully charge a battery of the same capacity within a substantially shorter charging period, and the charging is faster.

In some implementations, the first communication control circuit 222 conducts a two-way communication with the second communication control circuit 235 to control a transmission power of the wireless charging device 220 in the first wireless charging mode.

In some implementations, the first communication control circuit 222 conducts the two-way communication with the second communication control circuit 235 to control the transmission power of the wireless charging device 220 in the first wireless charging mode as follows. The first communication control circuit 222 conducts the two-way communication with the second communication control circuit 235 to negotiate which wireless charging mode to be used between the wireless charging device 220 and the device to-be-charged 230.

Specifically, the first communication control circuit 222 can conduct handshake communication with the second communication control circuit 235 and control the wireless charging device 220 to charge the device to-be-charged 230 in the first wireless charging mode when the handshake communication succeeds, or control the wireless charging device 220 to charge the device to-be-charged 230 in the second wireless charging mode when the handshake communication fails.

The handshake communication can refer to recognition of identities of the two communication parties. A successful handshake communication means that both the wireless charging device 220 and the device to-be-charged 230 can support or are operable in the wireless charging manner in which the transmission power is adjustable. A failed handshake communication means that at least one of the wireless charging device 220 and the device to-be-charged 230 does not support the wireless charging manner in which the transmission power is adjustable.

In the implementations of the disclosure, the wireless charging device 220 does not conduct quick wireless charging on the device to-be-charged 230 indiscriminately in the first wireless charging mode. Instead, the wireless charging device 220 conducts a two-way communication with the device to-be-charged 230 to negotiate whether the wireless charging device 220 can perform quick wireless charging on the device to-be-charged 230 in the first wireless charging mode, which can make a charging process safer.

Specifically, the first communication control circuit 222 conducts the two-way communication with the second communication control circuit 235 to negotiate which wireless charging mode to be used between the wireless charging device 220 to charge the device to-be-charged 230 as follows. The first communication control circuit 222 sends a first instruction to the second communication control circuit 235, where the first instruction is used for asking the device to-be-charged 230 whether to enable the first wireless charging mode. The first communication control circuit 222 receives from the second communication control circuit 235 a reply instruction of the first instruction, where the reply instruction is used for indicating whether the device to-be-charged 230 agrees to enable the first wireless charging mode. When the device to-be-charged 230 agrees to enable the first wireless charging mode, the first communication control circuit 222 controls the wireless charging device 220 to charge the device to-be-charged 230 in the first wireless charging mode.

Besides determining the wireless charging mode to be used by negotiating, the first communication control circuit 222 can further select or switch wireless charging mode according to other factors. Exemplarily, the first communication control circuit 222 can further control the wireless charging device 220 to charge the battery 232 in the first wireless charging mode or in the second wireless charging mode according to the temperature of the battery 232.

For example, when the temperature is lower than a preset first threshold, such as 5° C. or 10° C., the first communication control circuit 222 can control the wireless charging device 220 to adopt the second wireless charging mode for normal charging. When the temperature is higher than or equal to the first threshold, the first communication control circuit 222 can control the wireless charging device 220 to adopt the first wireless charging mode for quick charging. In addition, when the temperature is higher than a high-temperature threshold, such as 50° C., the first communication control circuit 222 can control the wireless charging device 220 to stop charging.

It should be noted that, the wireless charging manner in which the transmission power is adjustable provided herein can be adopted to control one or more of the charging stages of the battery 232. For example, the wireless charging manner in which the transmission power is adjustable can be mainly used to control the constant-current charging stage of the battery 232. In other examples, the device to-be-charged 230 can still be provided with the converting circuit. When the battery is in the trickle charging stage or in the constant-voltage charging stage, the conventional wireless charging manner illustrated in FIG. 1 can be adopted for charging. Specifically, when the battery 232 is in the trickle charging stage or in the constant-voltage charging stage, the converting circuit of the device to-be-charged 230 can convert the output voltage and the output current of the wireless receiving circuit 231 to make the output voltage and the output current of the wireless receiving circuit 231 meet requirements on charging in the trickle charging stage or in the constant-voltage charging stage. Compared with the constant-current charging stage, charging power of the battery 232 received in the trickle charging stage or in the constant-voltage charging stage is relatively low, so conversion efficiency loss and heat accumulation of the converting circuit of the device to-be-charged 230 are acceptable, which will be described in detail hereinafter in conjunction with FIG. 7.

Figure 7:
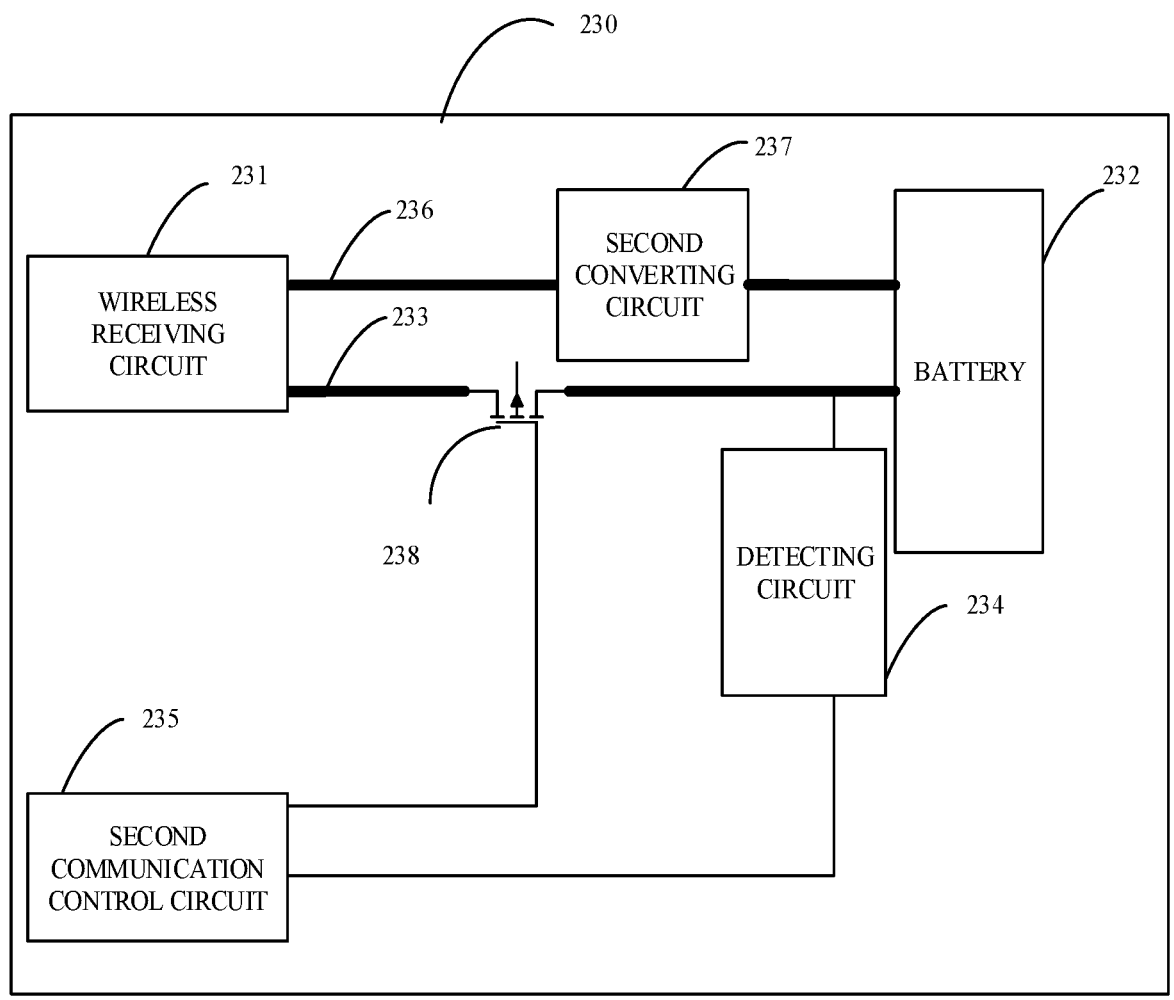
FIG. 7 is a schematic structural diagram of a device to-be-charged according to an implementation of the present disclosure.

As illustrated in FIG. 7, the device to-be-charged 230 further includes a first charging channel 233. The first charging channel 233 is configured to receive the output voltage and the output current of the wireless receiving circuit 231 and charge the battery 232 according to the output voltage and/or the output current of the wireless receiving circuit 231. In other words, through the first charging channel 233, the battery 232 can be charged directly according to the output voltage and output current of the wireless receiving circuit 231. For example, the first charging channel 233 can be wires (as illustrated in FIG. 1-FIG. 6). Still another example, in case that the device to-be-charged includes multiple charging channels, the first charging channel 233 can be provided with a switch(s) or other components (such as switch 238) for switching between different charging channels.

Reference is made to FIG. 7 again, where the device to-be-charged 230 further includes a second charging channel 236. The second charging channel 236 is provided with a second converting circuit 237. The second converting circuit 237 is configured to receive and convert the output current of the wireless receiving circuit 231, and the battery 232 can be charged according to the current subjected to conversion. The second communication control circuit 235 is further configured to control switching between the first charging channel 233 and the second charging channel 236. Exemplarily, as illustrated in FIG. 7, the first charging channel 233 can be provided with a switch 238. The second communication control circuit 235 can be configured to control switching between the first charging channel 233 and the second charging channel 236 by controlling on/off states of the switch 238.

As an example, when the battery 232 is in the trickle charging stage and/or in the constant-voltage charging stage, the second communication control circuit 235 can control to charge the battery 232 through the second charging channel 236. A constant-voltage and/or constant-current process of the battery can be controlled by the converting circuit 237 such as a charging IC. When the battery 232 is in the constant-current charging stage, the second communication control circuit 235 can control to charge the battery 232 through the first charging channel 233. Constant-current control of the battery can be realized based on adjustment of transmission power by the wireless charging device. With the converting circuit 237, the device to-be-charged 230 can be better compatible with the conventional wireless charging manner.

Figure 8:
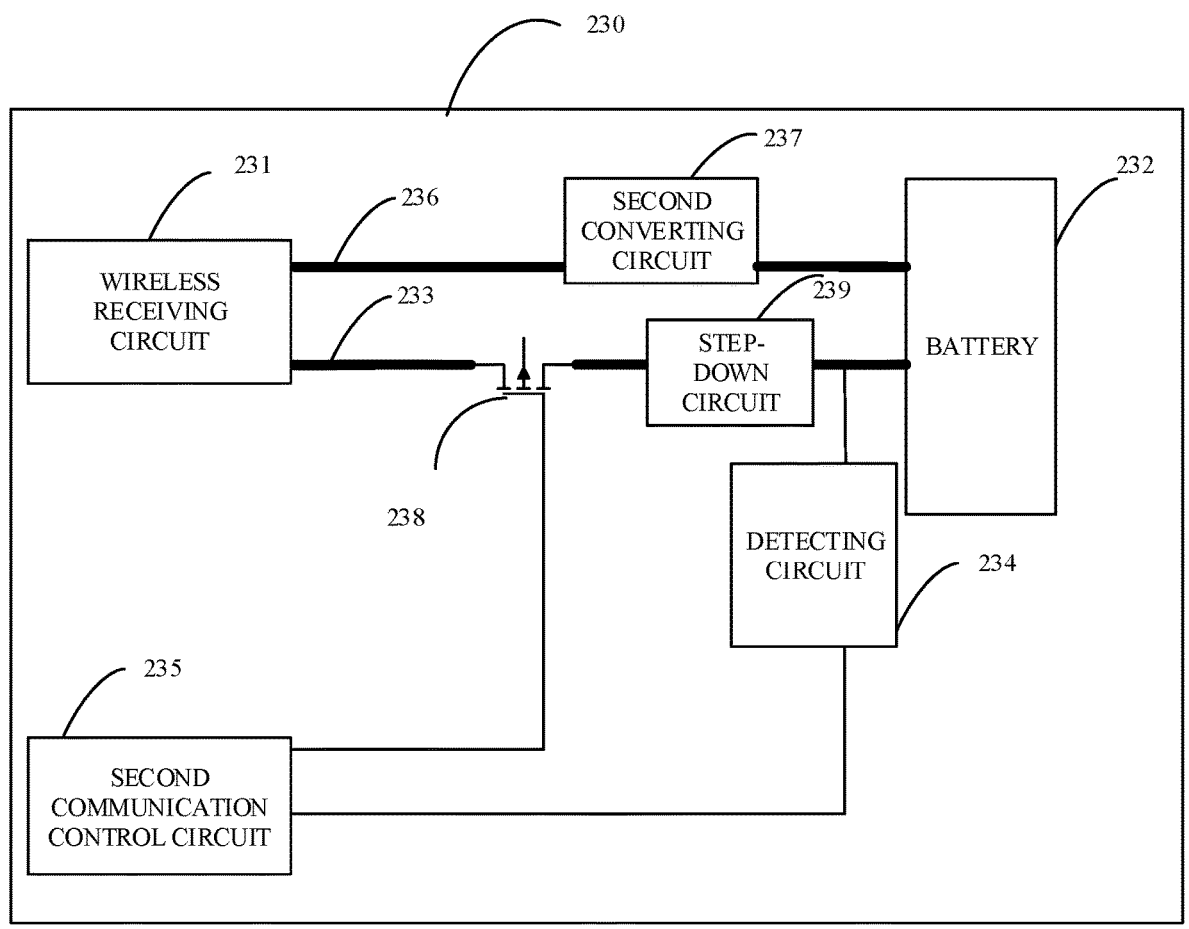
FIG. 8 is a schematic structural diagram of a device to-be-charged according to another implementation of the present disclosure.

In some implementations, as illustrated in FIG. 8, the device to-be-charged 230 further includes a step-down circuit 239 arranged on the first charging channel 233. The step-down circuit is configured to receive and then decrease the output voltage of the wireless receiving circuit 231, to charge the battery 232. The step-down circuit 239 can be implemented in various manners. For example, the step-down circuit 239 can be a Buck circuit; alternatively, the step-down circuit 239 can be a charge pump. The charge pump is composed of multiple switch components. Heat produced when current flows through the multiple switch components is small, almost the same as heat produced when current flows directly through a wire. Therefore, by adopting the charge pump to decrease the voltage, not only can voltage be decreased, but also heating is low. Still another example, the step-down circuit can be a half-voltage circuit. The ratio of an output voltage to an input voltage of the half-voltage circuit is fixed, which makes the voltage difference of the step-down circuit stable and reduces the heat of the step-down circuit.

In implementations of the disclosure, the output voltage and/or the output current in the first charging channel 233 may refer to a voltage and/or current between the wireless receiving circuit 231 and the Step-down circuit 239, that is, the output voltage and/or output current of the wireless receiving circuit 231. Alternatively, the output voltage and/or the output current in the first charging channel 233 may refer to a voltage and/or current between the Step-down circuit 239 and the battery 232. On the other hand, if there is no Step-down circuit 239 on the first charging channel 233, then the output voltage and/or the output current in the first charging channel 233 may refer to the output voltage and/or output current of the wireless receiving circuit 231 or the voltage and/or current entering the battery 232.

Compared with the related art, the wireless charging device 220 and the device to-be-charged 230 can communicate with each other as mentioned above, in this way, there is no need to use a transmitting coil and a receiving coil, which are used for charging, to participate in communication, thus the problem of ripples in output voltage caused by coil communication can be solved. In terms of the voltage ripples occurred when the wireless receiving coil outputs, if the voltage ripples are not handled effectively, it may lead to wireless charging security problems and security risks. With aid of the technical solutions provided herein, voltage ripples can be eliminated, and accordingly, circuits for handling voltage ripples can be omitted, as such, the complexity of the charging circuit of the device to-be-charged can be reduced, the charging efficiency can be improved, and the setting space of the circuit can be saved. The battery can be charged through the first charging channel 233, where the first charging channel 233 is provided with a Step-down circuit 239. Since the device to-be-charged 230 feeds back to the wireless charging device 220 information on the voltage, current, or power entering the battery 232, the wireless charging device 220 can adjust the transmission power in real time. Since voltage ripples are eliminated and the Step-down circuit 239 can be implemented with a half-voltage circuit, complexity of the circuit can be further reduced, which is be beneficial to temperature control and charging efficiency improvement.

It should be noted that, the manner in which the first charging channel 233 or the second charging channel 236 is selected can be various and is not limited to making a selection according to the present charging stage of the battery 232.

In some implementations, the second communication control circuit 235 can be further configured to conduct handshake communication with the first communication control circuit 222 and control the first charging channel 233 to work when the handshake communication succeeds, or control the second charging channel 236 to work when the handshake communication fails.

The handshake communication can refer to recognition of identities of the two communication parties. A successful handshake communication means that both the wireless charging device 220 and the device to-be-charged 230 are operable in the wireless charging manner in which the transmission power is adjustable. A failed handshake communication means that at least one of the wireless charging device 220 and the device to-be-charged 230 does not support the wireless charging manner in which the transmission power is adjustable. When the handshake communication fails, the conventional wireless charging manner (such as a wireless charging manner based on the QI standard) can be adopted for charging through the second charging channel 236.

In some implementations, the second communication control circuit 235 can be further configured to control switching between the first charging channel 233 and the second charging channel 236 according to the temperature of the battery 232.

For example, when the temperature is lower than a preset first threshold, such as 5° C. or 10° C., the second communication control circuit 235 can control to conduct normal wireless charging through the second charging channel 236. When the temperature is higher than or equal to the first threshold, the second communication control circuit 235 can control to conduct quick wireless charging through the first charging channel 233. In addition, when the temperature is higher than a high-temperature threshold such as 50° C., the second communication control circuit 235 can control to stop charging.

As pointed above, the output current of the wireless receiving circuit 231 can be a pulsating DC, which can reduce lithium precipitation of the battery 232 and prolong service life of the battery. When the output current of the wireless receiving circuit 231 is a pulsating DC, the second communication control circuit 235 can detect a peak value or an average value of the pulsating DC with the detecting circuit 234 to conduct subsequent communication or control according to the peak value or the average value of the pulsating DC.

Figure 9:
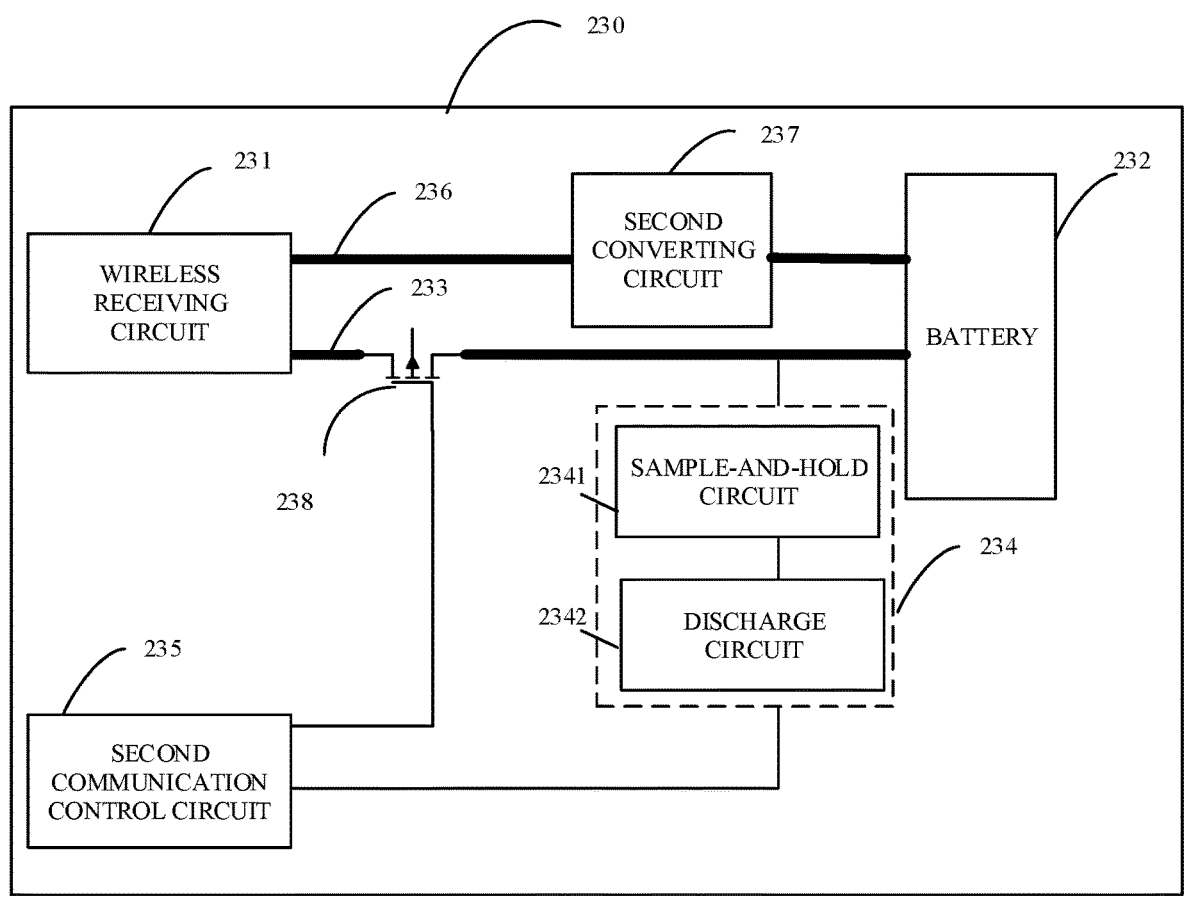
FIG. 9 is a schematic structural diagram of a device to-be-charged according to another implementation of the present disclosure.

In an implementation, the detecting circuit 234 detects the peak value of the pulsating DC. As illustrated in FIG. 9, the detecting circuit 234 includes a sample-and-hold circuit 2341. The sample-and-hold circuit 2341 is configured to sample the pulsating DC when the sample-and-hold circuit 2341 is in a sample state and hold a peak current of the pulsating DC when the sample-and-hold circuit 2341 is in a hold state. The second communication control circuit 235 is further configured to determine whether the sample-and-hold circuit 2341 is in the hold state and to obtain the peak current of the pulsating DC held by the sample-and-hold circuit 2341 if the sample-and-hold circuit 2341 is in the hold state. The second communication control circuit 235 is further configured to control the sample-and-hold circuit 2341 to switch from the hold state to the sample state after obtaining the peak current of the pulsating DC.

In some implementations, the sample-and-hold circuit 2341 includes a capacitor, and the sample-and-hold circuit 2341 is configured to hold the peak current of the pulsating DC based on the capacitor of the sample-and-hold circuit 2341. The detecting circuit 234 further includes a discharge circuit 2342, and the second communication control circuit 235 is further configured to release electric charges across the capacitor of the sample-and-hold circuit 2341 via the discharge circuit 2342 to make the sample-and-hold circuit 2341 switch to the sample state from the hold state.

In some examples, the wireless charging device 220 further includes an external interface and a wireless data transmission circuit. The external interface is configured to be coupled with an electronic device with a data processing and transmission function. The external interface can be the charging interface mentioned above or other interfaces. The first communication control circuit 222 is further configured to charge the device to-be-charged 230 wirelessly according to an output power of the electronic device with a data processing and transmission function when the external interface is coupled with the electronic device. The wireless data transmission circuit is configured to transmit data stored in the electronic device to the device to-be-charged 230 via a wireless link, or transmit data stored in the device to-be-charged 230 to the electronic device via the wireless link, when the wireless charging control unit charges the device to-be-charged 230 wirelessly according to the output power of the electronic device. The wireless data transmission circuit is configured to transmit at least one of: data in USB protocol format, data in display port (DP) protocol format, and data in mobile high-definition link (MHL) protocol format.

Figure 10:
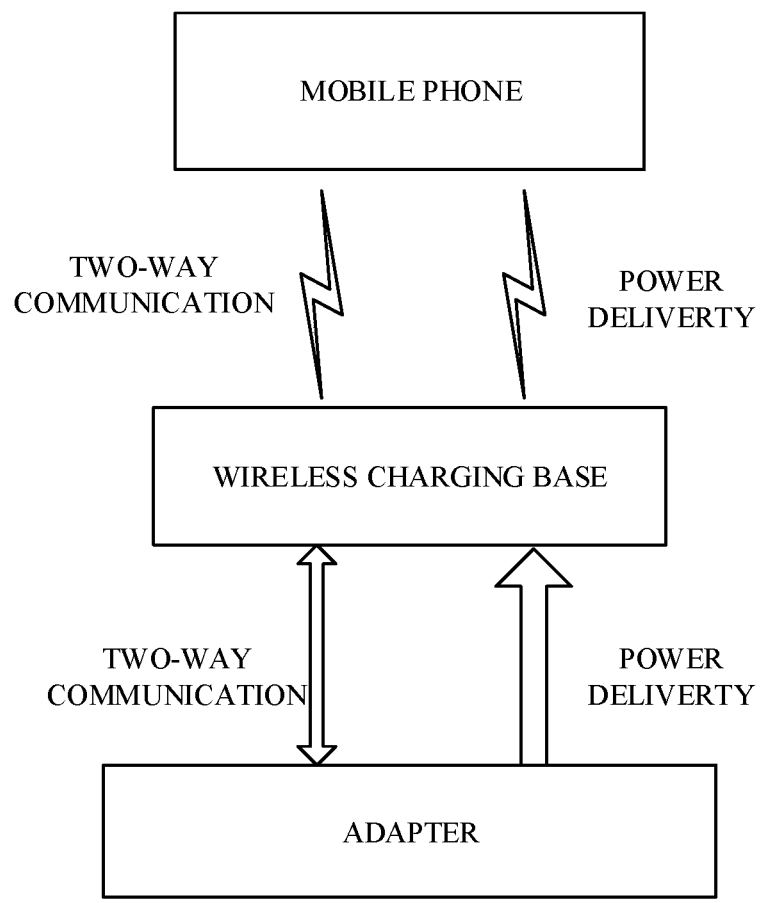
FIG. 10 is a schematic structural diagram of a wireless charging system according to another implementation of the present disclosure.

Implementations of the present disclosure will be described below in conjunction with specific examples. In FIG. 10, the wireless charging device is a wireless charging base, the power supply device is an adapter, and the device to be charged is a mobile phone. The example in FIG. 10 is merely intended to help those skilled in the art understand implementations of the disclosure, rather than limiting the same to specific values or scenarios illustrated. According to the examples given in FIG. 10, various equivalent modifications or changes can be made by those skilled in the art, and such modifications or changes fall within implementations of the disclosure.

Step 1, the mobile phone conducts wireless communication with the wireless charging base.

Specifically, communication protocols relating to the two-way communication between the mobile phone and the wireless charging base can be customized by the manufacturer. In addition, the mobile phone and wireless charging base can communicate through Bluetooth, Wi-Fi and other means.

Step 2, the wireless charging base conducts wired two-way communication with the adapter.

Specifically, communication protocols relating to the two-way communication between the wireless charging base and the adapter can be customized by the manufacturer. In addition, the wireless charging base and the adapter can communicate with each other via USB lines, for example, via D+ line and D− line of the USB line.

Step 3, the wireless charging base is connected to the adapter and conducts handshake communication with the adapter.

Specifically, after being connected to the adapter, the wireless charging base can conduct communication handshake with the adapter, to determine the type of the adapter and the level of power that the adapter can provide.

Step 4, the wireless charging base is connected to the mobile phone and conduct handshake communication with the mobile phone.

Specifically, after being connected to the mobile phone, the wireless charging case can conduct communication handshake with the mobile phone, to determine the type of the mobile phone as well as the level of power that can be supported by the mobile phone.

Step 5, start wireless charging when the handshake between the wireless charging base and the mobile phone and the handshake between the wireless charging base and the adapter are successful.

The wireless receiving circuit inside the mobile terminal can charge the battery directly ("direct charging" for short). In order to adjust the output current or output voltage of the wireless receiving circuit according to the present charging stage of the battery. The communication control circuit inside the mobile phone can keep communication with the wireless charging base during wireless charging, to instruct the wireless charging base to adjust the transmission power of the wireless transmitting circuit in real time. For example, the communication control circuit inside the mobile phone can acquire the present state of the battery in real time and send adjustment information to the wireless charging device based on the present state of the battery, based on the adjustment information, the output voltage or output current of the power adapter can be adjusted. Upon receiving the adjust information, the wireless charging device can conduct two-way communication with the adapter to instruct the same to adjust the output voltage and/or output current thereof.

It should be noted that, if the handshake between the wireless charging case and any one of the mobile phone and the adapter is failed, the wireless charging case will conduct charging in a traditional manner. For example, the wireless charging base can charge the device to-be-charged (that is, the mobile phone) at 5 W power according to QI standard, where 5 W corresponds to a low level of power under QI standard.

Devices according to implementations of the disclosure have been described above with reference to FIG. 2 to FIG.

10. In the following, methods according to implementations of the disclosure will be presented with reference to FIG. 11 to FIG. 13. The methods correspond to the devices and therefore, for details not given below, reference can be made to the foregoing description.

FIG. 11 is a schematic flowchart of a wireless charging method according to an implementation of the disclosure. The method of claim 11 can be implemented by a wireless charging system such as the wireless charging system 200. The wireless charging system includes a wireless charging device and a device to-be-charged, and the wireless charging device is configured to charge the device to-be-charged wirelessly.

The wireless charging device includes a wireless transmitting circuit for transmitting an electromagnetic signal(s). The device to-be-charged includes a battery, a wireless receiving circuit, and a detecting circuit. The wireless receiving circuit is configured to receive and convert the electromagnetic signal to provide an output voltage and an output current to the battery. The detecting circuit is configured to detect the output voltage and/or the output current of the wireless receiving circuit.

The method illustrated in FIG. 11 includes the following.

1110, the device to-be-charged conducts wireless communication with the wireless charging device to send the output voltage and/or output current detected by the detecting circuit to the wireless charging device, whereby the wireless charging device adjusts a transmission power of the wireless transmitting circuit, so as to meet charging requirements of the battery.

Optionally, in some implementations, the device to be charged further includes a first charging channel, configured to receive the output voltage and the output current of the wireless receiving circuit, where the battery is charged according to the output voltage and the output current of the wireless receiving circuit through the first charging channel.

Optionally, in some implementations, the first charging channel is provided with a step-down circuit, and the step-down circuit is configured to receive the output voltage of the wireless receiving circuit and decrease the output voltage of the wireless receiving circuit to charge the battery.

Optionally, in some implementations, the step-down circuit is a half-voltage circuit.

Optionally, in some implementations, the wireless charging device further includes a first converting circuit, which is configured to receive an output voltage and an output current of a power supply device and convert the output voltage and the output current of the power supply device. The wireless transmitting circuit is further configured to generate the electromagnetic signal according to the output voltage and the output current which are subjected to conversion.

Optionally, in some implementations, the first communication control circuit adjusts the transmission power of the wireless transmitting circuit as follows. The first communication control circuit adjusts the voltage and/or current subjected to conversion of the first converting circuit to adjust the transmission power of the wireless transmitting circuit.

Optionally, in some implementations, the wireless charging device further includes a charging interface. The wireless transmitting circuit is further configured to receive an output voltage and an output current of a power supply device through the charging interface and generate the electromagnetic signal according to the output voltage and the output current of the power supply device.

Optionally, in some implementations, the method of FIG. 11 further includes: the wireless charging device communicates with the power supply device to negotiate the output power of the power supply device.

Optionally, in some implementations, the wireless charging device communicates with the power supply device to negotiate the output power of the power supply device as follows. The wireless charging device communicates with the power supply device to negotiate the maximum output power of the power supply device. The wireless charging device adjusts the transmission power of the wireless transmitting circuit as follows. When the wireless transmitting circuit charges the device to-be-charged wirelessly according to the maximum output power of the power supply device, the wireless charging device adjusts an amount of power extracted by the wireless transmitting circuit from the maximum output power, to adjust the transmission power of the wireless transmitting circuit.

Optionally, in some implementations, the wireless charging device adjusts the transmission power of the wireless transmitting circuit as follows. The wireless charging device communicates with the power supply device to adjusts the output voltage and/or output current of the power supply device, so as to adjust the transmission power of the wireless transmitting circuit.

Optionally, in some implementations, the method of FIG. 11 further includes the follows. The device to-be-charged sends adjustment information to the wireless charging device. The adjustment information is for instructing the wireless charging device to adjust the output voltage and/or output current of the power supply device.

Optionally, in some implementations, the device to-be-charged conducts wireless communication with the wireless charging device, to send the output voltage and/or output current detected by the detecting circuit to the wireless charging device, whereby the wireless charging device adjusts the transmission power of the wireless transmitting circuit, to make the output voltage and/or the output current of the wireless receiving circuit match the present charging stage of the battery, so as to meet charging requirements of the battery. The present charging stage of the battery comprises at least one of a trickle charging stage, a constant-voltage charging stage, and a constant-current charging stage.

Optionally, in some implementations, "the device to-be-charged conducts wireless communication with the wireless charging device to send to the wireless charging device the output voltage and/or output current of the wireless receiving circuit detected by the detecting circuit, whereby the wireless charging device adjusts the transmission power of the wireless transmitting circuit according to the output voltage and/or output current of the wireless receiving circuit" is achieved as follows. In the constant-voltage charging stage of the battery, the device to-be-charged conducts wireless communication with the wireless charging device according to the output voltage and/or the output current of the wireless receiving circuit detected by the detecting circuit, whereby the wireless charging device adjusts the transmission power of the wireless transmitting circuit to make the output voltage of the wireless receiving circuit match a charging voltage corresponding to the constant-voltage charging stage.

Optionally, in some implementations, "the device to-be-charged conducts wireless communication with the wireless charging device to send to the wireless charging device the output voltage and/or output current of the wireless receiving circuit detected by the detecting circuit, whereby the wireless charging device adjusts the transmission power of the wireless transmitting circuit according to the output voltage and/or output current of the wireless receiving circuit" is achieved as follows. In the constant-current charging stage of the battery, the device to-be-charged conducts wireless communication with the wireless charging device according to the output voltage and/or the output current of the wireless receiving circuit detected by the detecting circuit, whereby the wireless charging device adjusts the transmission power of the wireless transmitting circuit to make the output current of the wireless receiving circuit match a charging current corresponding to the constant-current charging stage.

Optionally, in some implementations, the method of FIG. 11 may further include the following. The device to-be-charged sends battery state information to the wireless charging device, whereby the wireless charging device adjusts the transmission power of the wireless transmitting circuit according to the battery state information. The battery state information includes present power and/or present voltage of the battery of the device to-be-charged.

Optionally, in some implementations, information communicated between the wireless charging device and the device to-be-charged includes at least one of: temperature information of the battery; information indicative of a peak value or an average value of at least one of the output voltage and the output current of the wireless receiving circuit; information indicative of entering over-voltage protection or over-current protection; power-delivery efficiency information indicative of efficiency in power delivery between the wireless transmitting circuit and the wireless receiving circuit.

Optionally, in some implementations, the information communicated comprises the power-delivery efficiency information. The method of FIG. 11 further includes the following. The wireless charging device determines an adjustment range of the transmission power of the wireless transmitting circuit according to the power-delivery efficiency information.

Optionally, in some implementations, the device to-be-charged further includes a second charging channel, which is provided with a second converting circuit. The second converting circuit is configured to receive and convert the output current of the wireless receiving circuit, whereby the battery is charged through the second charging channel based on the current subjected to conversion. The method of FIG. 11 further includes that the device to-be-charged controls switching between the first charging channel and the second charging channel.

Optionally, in some implementations, the method of FIG. 11 further includes the following. The device to-be-charged conducts handshake communication with the wireless charging device and controls the first charging channel to work when the handshake communication succeeds, or controls the second charging channel to work when the handshake communication fails.

Optionally, in some implementations, the method of FIG. 11 further includes the following. The device to-be-charged controls switching between the first charging channel and the second charging channel according to the temperature of the battery.

Optionally, in some implementations, the wireless charging device is operable in a first wireless charging mode or in a second wireless charging mode, and a charging speed at which the wireless charging device charges the device to-be-charged in the first wireless charging mode is higher than in the second wireless charging mode.

Optionally, in some implementations, the method of FIG. 11 further includes the following. The wireless charging device and the device to-be-charged communicates with each other to negotiate for use of the first wireless charging mode or the second wireless charging mode for wireless charging.

Optionally, in some implementations, the wireless charging device and the device to-be-charged communicates with each other to negotiate for use of the first wireless charging mode or the second wireless charging mode for wireless charging as follows. The wireless charging device conducts handshake communication with the device to-be-charged and controls the wireless charging device to charge the device to-be-charged in the first wireless charging mode when the handshake communication succeeds, or controls the wireless charging device to charge the device to-be-charged in the second wireless charging mode when the handshake communication fails.

Optionally, in some implementations, the method of FIG. 11 further includes the following. The wireless charging device controls for use of the first wireless charging mode or the second wireless charging mode to charge the battery.

FIG. 12 is a schematic flowchart of a wireless charging method according to another implementation of the disclosure. The method of FIG. 12 can be implemented by a wireless charging device, such as the wireless charging device 220. The wireless charging device includes a wireless transmitting circuit configured to transmit an electromagnetic signal(s).

The method of FIG. 12 includes the following.

1210, during wireless charging of the device to-be-charged, the wireless charging device conducts wireless communication with the device to-be-charged, to adjust the transmission power of the wireless transmitting circuit, so as to meet charging requirements of the device to-be-charged.

Optionally, in some implementations, the wireless charging device further includes a converting circuit, which is configured to receive and convert an output voltage and output current of a power supply device. The wireless transmitting circuit is further configured to generate the electromagnetic signal according to the voltage and current which are subjected to conversion ("converted voltage" and "converted current" for short).

Optionally, in some implementations, the wireless charging device further includes a charging interface. The wireless transmitting circuit is further configured to receive, through the charging interface, the output voltage and output current of the power supply device, and generate the electromagnetic signal according to the output voltage and the output current of the power supply device.

Optionally, in some implementations, the method of FIG. 12 further includes the following. Communicate with the power supply device to negotiate the output power of the power supply device.

Optionally, in some implementations, "communicate with the power supply device to negotiate the output power of the power supply device" is achieved as follows. Communicate with the power supply device to negotiate the maximum output power of the power supply device. The transmission power of the wireless transmitting circuit is adjusted as follows. When the wireless transmitting circuit charges the device to-be-charged wirelessly according to the maximum output power of the power supply device, adjust an amount of power extracted by the wireless transmitting circuit from the maximum output power, to adjust the transmission power of the wireless transmitting circuit.

Optionally, in some implementations, the transmission power of the wireless charging device is adjusted as follows. Communicate with the power supply device to adjust the output voltage and/or output current of the power supply device, so as to adjust the transmission power of the wireless transmitting circuit.

Optionally, in some implementations, the method of FIG. 12 further includes the follows. Receive adjustment information from the device to-be-charged. The adjustment information is for instructing the wireless charging device to adjust the output voltage and/or output current of the power supply device.

Optionally, in some implementations, during wireless charging of the device to-be-charged, conduct wireless communication with the device to-be-charged to adjust the transmission power of the wireless transmitting circuit, to make the output voltage and/or output current of the wireless receiving circuit of the device to-be-charge match a present charging stage of the battery, so as to meet charging requirements of the battery. The present charging stage of the battery comprises at least one of a trickle charging stage, a constant-voltage charging stage, and a constant-current charging stage.

Optionally, in some implementations, "during wireless charging of the device to-be-charged, conduct wireless communication with the device to-be-charged to adjust the transmission power of the wireless transmitting circuit, to make the output voltage and/or output current of the wireless receiving circuit of the device to-be-charge match a present charging stage of the battery" is achieved as follows. In the constant-voltage charging stage of the battery, communicate with the device to-be-charged to adjust the transmission power of the wireless transmitting circuit, so as to make the output voltage of the wireless receiving circuit match a charging voltage of the constant-voltage charging stage.

Optionally, in some implementations, "during wireless charging of the device to-be-charged, conduct wireless communication with the device to-be-charged to adjust the transmission power of the wireless transmitting circuit, to make the output voltage and/or output current of the wireless receiving circuit of the device to-be-charge match a present charging stage of the battery" is achieved as follows. In the constant-current charging stage of the battery, communicate with the device to-be-charged to adjust the transmission power of the wireless transmitting circuit, so as to make the output current of the wireless receiving circuit match a charging current of the constant-current charging stage.

Optionally, in some implementations, the method of FIG. 12 may further include the following. Receive the battery state information from the device to-be-charged and adjust the transmission power of the wireless transmitting circuit according to the battery state information. The battery state information includes present power and/or present voltage of the battery of the device to-be-charged.

Optionally, in some implementations, information communicated between the wireless charging device and the device to-be-charged includes at least one of: temperature information of the battery; information indicative of a peak value or an average value of at least one of the output voltage and the output current of the wireless receiving circuit; information indicative of entering over-voltage protection or over-current protection; power-delivery efficiency information indicative of efficiency in power delivery between the wireless transmitting circuit and the wireless receiving circuit.

Optionally, in some implementations, the information communicated comprises the power-delivery efficiency information. The method of FIG. 12 further includes the following. Determine an adjustment range of the transmission power of the wireless transmitting circuit according to the power-delivery efficiency information.

Optionally, in some implementations, the wireless charging device is operable in a first wireless charging mode or in a second wireless charging mode, and a charging speed at which the wireless charging device charges the device to-be-charged in the first wireless charging mode is higher than in the second wireless charging mode.

Optionally, in some implementations, the method of FIG. 12 further includes the following. Communicate with the device to-be-charged to negotiate the use of the first wireless charging mode or the second wireless charging mode for wireless charging.

Optionally, in some implementations, "communicate with the device to-be-charged to negotiate the use of the first wireless charging mode or the second wireless charging mode for wireless charging" is achieved as follows. Conduct handshake communication with the device to-be-charged and controls the wireless charging device to charge the device to-be-charged in the first wireless charging mode when the handshake communication succeeds, or controls the wireless charging device to charge the device to-be-charged in the second wireless charging mode when the handshake communication fails.

Optionally, in some implementations, the method of FIG. 12 further includes the following. Control for use of the first wireless charging mode or the second wireless charging mode to charge the battery.

FIG. 13 is a schematic flowchart of a wireless charging method according to another implementation of the disclosure. The method of FIG. 13 can be implemented by a device to-be-charged, such as the device to-be-charged 230 described above. The device to-be-charged includes a battery, a wireless receiving circuit, and a detecting circuit. The wireless receiving circuit is configured to receive and convert the electromagnetic signal to provide an output voltage and an output current to the battery. The detecting circuit is configured to detect the output voltage and/or the output current of the wireless receiving circuit.

The method of FIG. 13 includes the following.

1310, communicate with the wireless charging device, to send the output voltage and/or output current detected by the detecting circuit to the wireless charging device, whereby the wireless charging device adjusts the transmission power thereof, to meet charging requirements of the battery.

Optionally, in some implementations, the device to-be-charged further includes a first charging channel, which is configured to receive the output voltage and output current of the wireless receiving circuit, where the battery is charged through the first charging channel according to the output voltage and output current of the wireless receiving circuit.

Optionally, in some implementations, the first charging channel is provided with a step-down circuit, and the step-down circuit is configured to receive the output voltage of the wireless receiving circuit and decrease the output voltage of the wireless receiving circuit to charge the battery.

Optionally, in some implementations, the step-down circuit is a half-voltage circuit.

Optionally, in some implementations, the method of FIG. 13 further includes the following. Send adjustment information to the wireless charging device. The adjustment information is for instructing the wireless charging device to adjust the output voltage and/or output current of the power supply device.

Optionally, in some implementations, conduct wireless communication with the wireless charging device, to send to the wireless charging device the output voltage and/or output current detected by the detecting circuit, whereby the wireless charging device adjusts the transmission power thereof, to make the output voltage and/or the output current of the wireless receiving circuit match the present charging stage of the battery, so as to meet charging requirements of the battery. The present charging stage of the battery comprises at least one of a trickle charging stage, a constant-voltage charging stage, and a constant-current charging stage.

Optionally, in some implementations, "conduct wireless communication with the wireless charging device to send to the wireless charging device the output voltage and/or output current of the wireless receiving circuit detected by the detecting circuit, whereby the wireless charging device adjusts the transmission power thereof, to make the output voltage and/or the output current of the wireless receiving circuit match the present charging stage of the battery" is achieved as follows. In the constant-voltage charging stage of the battery, conduct wireless communication with the wireless charging device according to the output voltage and/or the output current of the wireless receiving circuit detected by the detecting circuit, whereby the wireless charging device adjusts the transmission power thereof to make the output voltage of the wireless receiving circuit match a charging voltage corresponding to the constant-voltage charging stage.

Optionally, in some implementations, "conduct wireless communication with the wireless charging device to send to the wireless charging device the output voltage and/or output current of the wireless receiving circuit detected by the detecting circuit, whereby the wireless charging device adjusts the transmission power thereof, to make the output voltage and/or the output current of the wireless receiving circuit match the present charging stage of the battery" is achieved as follows. In the constant-current charging stage of the battery, conduct wireless communication with the wireless charging device according to the output voltage and/or the output current of the wireless receiving circuit detected by the detecting circuit, whereby the wireless charging device adjusts the transmission power thereof to make the output current of the wireless receiving circuit match a charging current corresponding to the constant-current charging stage.

Optionally, in some implementations, the method of FIG. 13 further includes the following. Send battery state information to the wireless charging device, whereby the wireless charging device adjusts the transmission power of the wireless transmitting circuit according to the battery state information. The battery state information includes present power and/or present voltage of the battery of the device to-be-charged.

Optionally, in some implementations, information communicated between the wireless charging device and the device to-be-charged includes at least one of: temperature information of the battery; information indicative of a peak value or an average value of at least one of the output voltage and the output current of the wireless receiving circuit; information indicative of entering over-voltage protection or over-current protection; power-delivery efficiency information indicative of efficiency in power delivery between the wireless transmitting circuit and the wireless receiving circuit.

Optionally, in some implementations, the device to-be-charged further includes a second charging channel, which is provided with a converting circuit. The converting circuit is configured to receive and convert the output current of the wireless receiving circuit, whereby the battery is charged through the second charging channel based on the current subjected to conversion. The method of FIG. 13 further includes controlling switching between the first charging channel and the second charging channel.

Optionally, in some implementations, the method of FIG. 13 further includes the following. Conduct handshake communication with the wireless charging device and control the first charging channel to work when the handshake communication succeeds, or control the second charging channel to work when the handshake communication fails.

Optionally, in some implementations, the method of FIG. 13 further includes controlling switching between the first charging channel and the second charging channel according to the temperature of the battery.

Optionally, in some implementations, the wireless charging device is operable in a first wireless charging mode or in a second wireless charging mode, and a charging speed at which the wireless charging device charges the device to-be-charged in the first wireless charging mode is higher than in the second wireless charging mode. The method of FIG. 13 further includes the following. Conduct wireless communication with the wireless charging device to negotiate for use of the first wireless charging mode or the second wireless charging mode for wireless charging All or part of the above implementations can be implemented through software, hardware, firmware, or any other combination thereof. When implemented by software, all or part of the above implementations can be implemented in the form of a computer program product. The computer program product includes one or more computer instructions. When the computer program instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer readable storage medium can be any computer accessible usable-medium or a data storage device such as a server, a data centre, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units is only a division of logical functions, and there may exist other ways of division in practice, e.g., multiple units or components may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Additionally, various functional units described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device to-be-charged, comprising:
   a battery;
   a wireless receiving circuit, configured to receive an electromagnetic signal from a wireless charging device and convert the electromagnetic signal into an output voltage and an output current to be provided to the battery;
   a detecting circuit, configured to detect at least one of the output voltage and the output current of the wireless receiving circuit;
   a communication control circuit, configured to conduct wireless communication with the wireless charging device to provide at least one of the output voltage and the output current detected by the detecting circuit to the wireless charging device, to make the wireless charging device adjust a transmission power of a wireless transmitting circuit to meet charging requirements of the battery;
   a first charging channel, configured to receive the output voltage and the output current of the wireless receiving circuit, wherein the battery is charged according to the output voltage and the output current of the wireless receiving circuit through the first charging channel, wherein the first charging channel is provided with a step-down circuit, the step-down circuit is configured to receive the output voltage of the wireless receiving circuit and decrease the output voltage of the wireless receiving circuit to charge the battery; and
   a second charging channel, provided with a converting circuit, wherein the converting circuit is configured to receive and convert the output current of the wireless receiving circuit, wherein the battery is charged according to the output current subjected to the conversion, and wherein the communication control circuit is further configured to control switching between the first charging channel and the second charging channel.

2. The device to-be-charged of claim 1, wherein the communication control circuit is further configured to send adjustment information to the wireless charging device, wherein the adjustment information is for instructing the wireless charging device to adjust at least one of an output voltage and an output current of a power supply device.

3. The device to-be-charged of claim 1, wherein the communication control circuit is configured to conduct wireless communication with the wireless charging device to send at least one of the output voltage and the output current detected by the detecting circuit to the wireless charging device, to make the wireless charging device adjust the transmission power of the wireless charging device to make at least one of the output voltage and the output current of the wireless receiving circuit match a present charging stage of the battery to meet charging requirements of the battery, the present charging stage of the battery comprises at least one of a trickle charging stage, a constant-voltage charging stage, and a constant-current charging stage.

4. The device to-be-charged of claim 1, wherein the communication control circuit is further configured to send battery-state information to the wireless charging device, to make the wireless charging device adjust the transmission power of the wireless transmitting circuit according to the battery-state information, wherein the battery-state information comprises at least one of a present power and a present voltage of the battery of the device to-be-charged.

5. The device to-be-charged of claim 1, wherein the communication control circuit is further configured to conduct handshake communication with the wireless charging device and control the first charging channel to work when the handshake communication succeeds, or control the second charging channel to work when the handshake communication fails.

6. The device to-be-charged of claim 1, wherein the communication control circuit is further configured to control switching between the first charging channel and the second charging channel according to a temperature of the battery.

7. The device to-be-charged of claim 1, wherein the output current of the wireless receiving circuit is a constant DC, a pulsating DC, or an AC and wherein the output current of the wireless receiving circuit is the pulsating DC, and wherein
   the detecting circuit comprises a sample-and-hold circuit, configured to sample the pulsating DC when the sample-and-hold circuit is in a sample state and hold a peak current of the pulsating DC when the sample-and-hold circuit is in a hold state; and
   the communication control circuit is further configured to determine whether the sample-and-hold circuit is in the hold state and to obtain the peak current of the pulsating DC held by the sample-and-hold circuit upon determining that the sample-and-hold circuit is in the hold state.

8. The device to-be-charged of claim 7, wherein
   the sample-and-hold circuit comprises a capacitor, and the sample-and-hold circuit is configured to hold the peak current of the pulsating DC based on the capacitor of the sample-and-hold circuit; and the detecting circuit further comprises a discharge circuit, and the communication control circuit is further configured to release electric charges across the capacitor of the sample-and-hold circuit via the discharge circuit to make the sample-and-hold circuit switch to the sample state from the hold state.

9. A method for wireless charging, being applicable to a device to-be-charged, the device to-be-charged comprising:
a battery;
a wireless receiving circuit, configured to receive an electromagnetic signal from a wireless charging device and convert the electromagnetic signal to provide an output voltage and an output current to the battery;
a detecting circuit, configured to detect at least one of the output voltage and the output current of the wireless receiving circuit;
a first charging channel, configured to receive the output voltage and the output current of the wireless receiving circuit, wherein the battery is charged according to the output voltage and the output current of the wireless receiving circuit through the first charging channel, wherein the first charging channel is provided with a step-down circuit, the step-down circuit is configured to receive the output voltage of the wireless receiving circuit and decrease the output voltage of the wireless receiving circuit to charge the battery; and
a second charging channel, provided with a converting circuit, wherein the converting circuit is configured to receive and convert the output current of the wireless receiving circuit, wherein the battery is charged according to the output current subjected to the conversion,
wherein the method comprises conducting wireless communication with the wireless charging device to provide at least one of the output voltage and the output current detected by the detecting circuit to the wireless charging device, to make the wireless charging device adjust a transmission power of the wireless transmitting circuit to meet charging requirements of the battery, and controlling switching between the first charging channel and the second charging channel.

* * * * *